United States Patent

Tahara et al.

[11] Patent Number: 5,877,846
[45] Date of Patent: Mar. 2, 1999

[54] EXPOSURE CONTROL METHOD AND PHOTOGRAPHIC PRINTER

[75] Inventors: Shuji Tahara; Akirou Terajima; Kazuhiko Katakura, all of Kanagawa, Japan

[73] Assignee: Fuji Photo Film Co., Ltd., Kanagawa, Japan

[21] Appl. No.: 711,745

[22] Filed: Sep. 10, 1996

[30] Foreign Application Priority Data

Sep. 19, 1995 [JP] Japan .................................. 7-239798
Sep. 19, 1995 [JP] Japan .................................. 7-239799

[51] Int. Cl.$^6$ ................................................. G03B 27/52
[52] U.S. Cl. ................................. 355/67; 355/71; 355/37; 355/32; 355/69; 359/84; 359/86
[58] Field of Search ..................................... 355/1, 67–70, 355/38, 77, 32, 35, 71; 348/745, 766; 359/84–86

[56] References Cited

U.S. PATENT DOCUMENTS

| 4,571,053 | 2/1986 | Kasama et al. ............................. | 355/1 |
| 5,122,831 | 6/1992 | Suzuki ..................................... | 355/37 |
| 5,703,671 | 12/1997 | Narita et al. .............................. | 355/32 |

FOREIGN PATENT DOCUMENTS

| 54-90993 | 7/1979 | Japan .................................. | G09F 9/30 |
| 4-147247 | 5/1992 | Japan .................................. | G03B 27/73 |

*Primary Examiner*—D. Rutledge
*Attorney, Agent, or Firm*—Sughrue, Mion, Zinn, Macpeak & Seas, PLLC

[57] ABSTRACT

A photographic printer for displaying an image on a liquid crystal panel, irradiating the light from a light source on said liquid crystal panel and exposing said image on a photosensitive material for a predetermined exposure time by the light transmitted through said liquid crystal panel is disclosed. Further, a method for controlling an exposure in such a photographic printer is disclosed. Before displaying an image on the liquid crystal panel, the drive voltage for producing a predetermined transmitted light amount is measured. On the basis of the difference between the measured voltage and the theoretical voltage for producing the predetermined transmitted light amount, an offset value of the drive voltage is adjusted. Accordingly, the operational error of the printer due to temperature change, due to the difference of the light transmittance between crystal panels, or due to the difference of the characteristic of voltage v.s. light transmittance between crystal panels is reduced.

8 Claims, 18 Drawing Sheets

EXPOSURE CONTROL METHOD AND PHOTOGRAPHIC PRINTER

BACKGROUND OF THE INVENTION

1. Field of the Invention

The present invention relates to a photographic printer and an exposure control method, or more in particular to a photographic printer for displaying an image on a liquid crystal panel, irradiating light from a light source (such as an LED) onto the liquid crystal panel and exposing the image on a photosensitive material by the light transmitted through the liquid crystal panel, and an exposure control method for such a photographic printer.

2. Description of the Related Art

An index print is well known in which in order to facilitate search for a photo taken in a developed negative film, a plurality of frame images are arranged in compressed form and printed in matrix.

As a technique for producing this index print by a photographic printer, what is called a liquid crystal photographic printer has been proposed, in which each frame image of a negative film is read by a scanner or the like, processed as an image in a predetermined manner and stored in a memory. Image data including several frames are each read and displayed on a liquid crystal panel at a predetermined timing, and the image data thus displayed are irradiated by light. The light transmitted through the displayed image are exposed on a printing paper and appropriately processed to produce an index print.

The characteristic of drive voltage versus light transmittance of the liquid crystal constituting a liquid crystal panel used for the above-mentioned liquid crystal photographic printer, however, changes with temperature, and therefore stable operation thereof is difficult to attain.

In view of this, a technique (JP-A-4-147247) using a liquid crystal panel having an open liquid crystal and a closed liquid crystal for detection has been proposed, in which the exposure light amount is controlled by feedback on the basis of the difference in the transmitted light amount between the open liquid crystal and the closed liquid crystal and the light amount transmitted through the open liquid crystal (i.e. the light amount from a light source).

In above-mentioned liquid crystal photographic printer, a method for displaying a halftone image on a liquid crystal and exposing the halftone image has been proposed.

However, the exposure light amount of a halftone image is difficult to control only on the basis of the light amount transmitted through full open and full closed liquid crystals as in the conventional method disclosed by the above-mentioned patent publication. Further, the relation between the drive voltage and the transmitted light amount (i.e., the characteristic of drive voltage versus transmitted light amount as shown in FIG. 8) of the liquid crystal panel changes with temperature, and this fact is not taken into consideration in the prior art.

In recent years, a light emitting diode (hereinafter referred to as the LED) has come to be used widely in place of the halogen lamp. The LED light source, as compared with the lamp light source, has the advantages that a very small amount of heat is generated when it is turned on, the lighting operation is easily controlled, and further it can be reduced in size. For these reasons, the LED has been used also for the liquid crystal photographic printer.

Despite these advantages, the disadvantage of the LED light source is that the light amount is liable to change with ambient temperature. In other words, the light amount change of the LED light source and the resulting light amount irregularities may deteriorate the quality of the photographic print.

Further, the open/close speed of each pixel of the liquid crystal panel is liable to change with ambient temperature, and the error of the open/close speed often causes an error of the time (exposure time) during which the printing paper is actually irradiated by light.

The present invention has been developed to obviate the above-mentioned problems and the object of the invention is to provide a photographic printer and an exposure control method capable of producing a photographic prints of stable quality.

SUMMARY OF THE INVENTION

According to a first aspect of the invention, there is provided an exposure control method for a photographic printer in which an image is displayed on a liquid crystal panel, light from a light source is irradiated on the liquid crystal panel, and the image is exposed on a photosensitive material by the light transmitted through the liquid crystal panel, the method comprising the steps of measuring, before displaying an image on the liquid crystal panel, a maximum transmitted light amount $E_1$ of the liquid crystal panel when a drive voltage $V_1$ for producing the maximum light transmittance of each pixel of the liquid crystal panel is applied to each pixel, determining a drive voltage $V_0$ for producing a reference transmitted light amount $E_0$ set smaller than the measured maximum transmitted light amount $E_1$, and adjusting the offset value of the drive voltage V to be applied to each pixel of the liquid crystal panel on the basis of the fact that a reference transmitted light amount $E_0$ is obtained as a value corresponding to the drive voltage $V_0$.

According to a second aspect of the invention, there is provided an exposure control method for a photographic printer in which an image is displayed on a liquid crystal panel, the liquid crystal panel is irradiated with light from a light source and the image is exposed on a photosensitive material by the light transmitted through the liquid crystal panel, the method comprising the steps of measuring, before displaying an image on the liquid crystal panel, a maximum transmitted light amount $E_1$ of the liquid crystal panel when a drive voltage $V_1$ for producing the maximum light transmittance of each pixel of the liquid crystal panel is applied to each pixel of the liquid crystal panel and a minimum transmitted light amount $E_2$ of the liquid crystal panel when a drive voltage $V_2$ for producing the minimum light transmittance of each pixel of the liquid crystal panel is applied to each pixel of the liquid crystal panel, determining an intermediate transmitted light amount $E_3$ $\{=(E_1+E_2)/2\}$ between the measured maximum transmitted light amount $E_1$ and the measured minimum transmitted light amount $E_2$ and an intermediate drive voltage $V_3$ associated with the intermediate transmitted light amount $E_3$, and adjusting a offset value of the drive voltage V to be applied to each pixel of the liquid crystal panel on the basis of the fact that the intermediate transmitted light amount $E_3$ is obtained as a value corresponding to the intermediate drive voltage $V_3$.

According to a third aspect of the invention, there is provided an exposure control method for a photographic printer in which an image is displayed on a liquid crystal panel, light from a light source is irradiated on the liquid crystal and the image is exposed on a photosensitive material by the light transmitted through the liquid crystal panel, the method comprising the steps of measuring, before displaying an image on the liquid crystal panel, an actual drive voltage $V_4'$ for producing a predetermined transmitted light amount $E_4$ and adjusting a offset value of the drive voltage V to be applied to each panel of the liquid crystal panel on the basis of the difference between the drive voltage $V_4'$ thus measured and a theoretical drive voltage $V_4$ for producing a transmitted light amount $E_4$.

By adjusting the offset value, the value of the drive voltage V actually applied uniformly increases or decreases by the amount so adjusted. In other words, as a result of adjusting the offset value of the drive voltage V, the characteristic curve of drive voltage V versus transmitted light amount E is corrected in such a manner as to shift along an axis representing the drive voltage V.

The present invention is intended to reduce the instrumental error due to the difference of the light transmittance between liquid crystal panels and the difference of the characteristic of voltage versus light transmittance between liquid crystal panels. The voltage-light transmittance characteristic is represented by the diagram of FIG. 3A, for example, in which the voltage actually used for exposure is in the range of $V_1$ to $V_2$.

An effective and simple method to reduce the error of the value of light transmittance and the voltage-light transmittance characteristic in a predetermined range (say, between $V_1$ and $V_2$), as described above with respect to the first to third aspects of the invention, is to adjust the offset value of the drive voltage in such a manner as to produce a proper light transmittance and a proper voltage-light transmittance characteristic at a specified point in the voltage range between $V_1$ and $V_2$.

In the first aspect, the maximum transmitted light amount $E_1$ of the liquid crystal panel of a photographic printer is measured when the drive voltage $V_1$ for producing the maximum light transmittance of each pixel of the liquid crystal panel is applied to each pixel of the liquid crystal panel, and then the drive voltage $V_0$ is determined for producing the reference transmitted light amount $E_0$ set smaller than the maximum transmitted light amount $E_1$.

The offset value of the drive voltage V to be applied to each pixel of the liquid crystal panel is adjusted on the basis of the fact that the reference transmitted light amount $E_0$ is obtained as a value corresponding to the drive voltage $V_0$. In other words, the actual drive voltage $V_0'$ for producing the reference transmitted light amount $E_0$ is measured, and the offset value of the drive voltage V to be applied to each pixel of the liquid crystal panel is adjusted on the basis of the difference between the measured drive voltage $V_0'$ and the drive voltage $V_0$.

In this way, the offset value of the drive voltage V is adjusted on the basis of the reference transmitted light amount $E_0$ set smaller than the maximum transmitted light amount $E_1$ rather than on the basis of the maximum transmitted light $E_1$ of the liquid crystal panel of the photographic printer. Therefore, the overall deviation of the voltage-light transmittance characteristic can be reduced in a predetermined range (say, voltage range between $V_1$ and $V_2$) more than in the case of adjusting the offset value of the drive voltage V on the basis of the maximum transmitted light amount $E_1$.

Further, in view of the fact that the reference value of the transmitted light amount is set to a reference transmitted light amount $E_0$ determined on the basis of the maximum transmitted light amount $E_1$ measured using the liquid crystal panel of an actual photographic printer rather than on the basis of an experimentally predetermined reference value, even in the case where a large instrument error exists due to the difference of light transmittance between crystal panels, a proper reference transmitted light amount can be set for each photographic printer, thereby compensating for the instrumental error due to the difference of light transmittance between crystal panels.

The quality of an exposed image an be stabilized by correcting the instrumental error of the voltage-light transmittance characteristic or the instrumental error of light transmittance as described above.

In the case where the reference transmitted light amount $E_0$ is set to a value about 50% of the maximum transmitted light amount $E_1$, a more effective result is obtained because the error of the voltage-light transmittance characteristic can be reduced uniformly in both the small and large ranges of transmitted light amount.

The method according to the second aspect of the invention comprises the steps of measuring the maximum transmitted amount $E_1$ when the drive voltage $V_1$ for producing the maximum light transmittance is applied to each pixel of the liquid crystal panel of a photographic printer and the minimum transmitted light amount $E_2$ when the drive voltage $V_2$ for producing the minimum light transmittance is applied to each pixel of the liquid crystal panel, determining the intermediate transmitted light amount $E_3$ $\{=(E_1+E_2)/2\}$ between the measured maximum transmitted light amount $E_1$ and the measured minimum transmitted light amount $E_2$ and the intermediate drive voltage $V_3$ associated with the intermediate transmitted light amount $E_3$, and adjusting the offset value of the drive voltage V to be applied to each pixel of the liquid crystal panel on the basis of the fact that the intermediate transmitted light amount $E_3$ is obtained as a value corresponding to the intermediate drive voltage $V_3$.

In this way, the minimum transmitted light amount $E_2$ as well as the maximum transmitted light amount $E_1$ of the liquid crystal panel of the photographic printer is measured, and the offset value of the drive voltage V is adjusted based on the intermediate transmitted light amount $E_3$ between the maximum transmitted light amount $E_1$ and the minimum transmitted light amount $E_2$. In other words, the offset value of the drive voltage is adjusted on the basis of the intermediate transmitted light amount $E_3$ at an intermediate point in a predetermined range actually used for exposure and the intermediate drive voltage $V_3$ associated with the intermediate transmitted light amount $E_3$. While compensating for the instrumental error due to the difference of light transmittance between crystal panels, therefore, the overall deviation of the voltage-light transmittance characteristic can be reduced in a predetermined range (say, between voltages $V_1$ and $V_2$).

The quality of the image exposed can be further stabilized by correcting the instrumental error due to the difference of the voltage-light transmittance characteristic between crystal panels and the instrumental error due to the difference of light transmittance between crystal panels.

In the case where the instrumental error due to the difference of light transmittance is small, as in the third aspect, the actual drive voltage $V_4'$ for producing a predetermined transmitted light amount $E_4$ may be measured, and the offset value of the drive voltage V to be applied to each pixel of the liquid crystal panel of the photographic printer may be adjusted on the basis of the difference between the drive voltage $V_4'$ measured and the drive voltage $V_4$ for producing the theoretical transmitted light amount $E_4$.

According to a fourth aspect of the invention, in any of the first to third aspects, at the time of adjusting the photographic printer for compensating for temperature change, the transmitted light amount is measured when a reference drive voltage is applied, and the offset value of the drive voltage V to be applied to each pixel of the liquid crystal is adjusted in such a manner that the relation between the drive voltage V and the transmitted light amount E of the liquid crystal panel set prior to displaying an image on the liquid crystal panel remains unchanged.

The voltage-light transmittance characteristic deviates along the direction of magnitude of the drive voltage V (laterally in FIG. 9) with temperature variations as shown in FIG. 9. As in the fourth aspect, therefore, at the time of adjusting the photographic printer to compensate for temperature variations, the transmitted light amount is measured with a reference drive voltage applied and the offset value of the drive voltage V is adjusted in such a manner that the transmitted light amount measured coincides with the reference transmitted light amount, i.e., in such a manner that the relation between the transmitted light amount E and the drive voltage V set prior to displaying the image on the liquid crystal panel remains unchanged.

As a result, the variations in the voltage-light transmittance characteristic due to temperature variations are compensated for thereby to stabilize the quality of the image exposed.

The wording "prior to displaying an image on the liquid crystal panel" used above is equivalent to say "before actual exposure of an image". This does not necessary mean "before each actual exposure of an image", but, for example, "at the time of factory shipment, installation in the customer's premises, or conducting maintenance work as when parts are changed.

According to a fifth aspect of the invention, there is provided an exposure control method for a photographic printer in which an image is displayed on a liquid crystal panel, light from a light source is irradiated on the liquid crystal panel, the image is exposed on a photosensitive material by the light transmitted through the liquid crystal panel, and the transmitted light amount is measured by a transmitted light amount sensor, the method comprising the steps of applying a predetermined drive voltage $V_0$ for producing a substantial halftone in a specific area of the liquid crystal panel, irradiating the light from the light source on the specific area, measuring the amount $E_1$ of the light transmitted through the liquid crystal panel by the transmitted light amount sensor, and correcting the relation between the drive voltage and the transmitted light amount on the basis of a measured amount $E_1$ and a reference amount $E_0$ of the transmitted light produced at the time of applying the drive voltage $V_0$.

In the fifth aspect, the predetermined voltage $V_0$ for producing a substantial halftone in a specific area of the liquid crystal panel is applied, and the light from the light source is irradiated to the specific area. The specific area may be either a part or the whole of the area used for image display on the liquid crystal panel. In order to reduce the overall power consumption, the specific area is preferably a part of the image display area.

As the next step, the amount $E_1$ of the light transmitted through the liquid crystal panel is measured by a transmitted light amount sensor, and the relation between the drive voltage and the transmitted light amount is corrected on the basis of the light amount $E_1$ measured and the reference amount $E_0$ of the transmitted light obtained upon application of the drive voltage $V_0$.

In the case under consideration, as shown in FIG. 15, for example, a voltage difference $\Delta V$ corresponding to the light amount difference $(E_1-E_0)$ is determined on the theoretical characteristic curve 140, and the characteristic curve 140 is shifted by the amount equal to the voltage difference $\Delta V$ (moved in parallel by $\Delta V$ rightward in FIG. 15), thereby producing the characteristic curve of drive voltage versus transmitted light amount in current environment. The characteristic curve 142 is subsequently used as the characteristic of drive voltage versus transmitted light amount.

As described above, even when the characteristic of drive voltage versus transmitted light amount changes with temperature variations, the characteristic of drive voltage versus transmitted light amount can be corrected smoothly on the basis of a point of correspondence between the drive voltage $V_0$ and the transmitted light amount $E_1$. Also, this reference point for correction is set to an intermediate tone level. The error of the characteristic of drive voltage versus transmitted light amount can thus be reduced uniformly in both ranges of high tone level and low tone level, thereby assuring correction of higher accuracy. The quality of the image exposed can be further stabilized in this way.

In the fifth aspect, a lamp light source such as a halogen lamp or an LED can be used as the light source.

According to a sixth aspect of the invention, there is provided an exposure control method according to the fifth aspect, further comprising the steps of, after correcting the relation between the drive voltage and the transmitted light amount, displaying in the specific area a high tone image higher in tone level by a predetermined amount and a low tone image lower in tone level by a predetermined amount than when the drive voltage $V_0$ is applied, irradiating light from a light source on the specific area, measuring the transmitted light amounts $E_2$, $E_3$ of the respective displayed images by a transmitted light amount sensor, and correcting the relation between the tone and the transmitted light amount on the basis of the light amount difference $\Delta E_{23}$ between $E_2$ and $E_3$ and the reference light amount difference $\Delta E$ corresponding to the tone level difference $\Delta L$ between the high tone image and the low tone image.

In the sixth aspect according to the fifth aspect, the relation between the drive voltage and the transmitted light amount is corrected, after which a predetermined high tone image and a predetermined low tone image are displayed in a specific area respectively, and light from a light source is irradiated on the specific area.

Then, the light amounts $E_2$, $E_3$ transmitted through each image on display are measured by the transmitted light amount sensor, and the relation between the tone and the transmitted light amount is corrected on the basis of the difference $\Delta E_{23}$ between the light amounts $E_2$ and $E_3$ and the reference light amount difference A E corresponding to the tone level difference $\Delta L$ between high and low tone images. In other words, the relation between the tone and the transmitted light amount is corrected in such a manner as to obtain the light amount difference $\Delta E_{23}$ corresponding to the tone level difference $\Delta L$ instead of the light amount difference $\Delta E$ corresponding to the tone level difference $\Delta L$.

As described above, even when the relation between the tone and the transmitted light amount (corresponding to the slope of the characteristic curve of drive voltage versus transmitted light amount) changes with temperature, the variation can be successfully corrected. As a result, the characteristic of drive voltage versus transmitted light amount can be accurately corrected, thereby further stabilizing the quality of the image exposed.

According to a seventh aspect of the invention, there is provided a photographic printer for displaying an image on a liquid crystal panel, irradiating the light from a light source onto the liquid crystal panel and exposing the image on a photosensitive material for a predetermined exposure time by the light transmitted through the liquid crystal panel, comprising a transmitted light amount sensor for measuring the amount of the transmitted light, and control means for controlling to start the count of the exposure time when a predetermined or more light amount is measured by the transmitted light amount sensor after the light from the light source is irradiated on the liquid crystal panel.

In the seventh aspect, upon irradiation of the light on the liquid crystal panel and completion of display of an image by each pixel of the liquid crystal panel, the light equal to or more than a predetermined amount is transmitted through the liquid crystal panel and the light amount equal to or more than a predetermined amount is measured by the transmitted light amount sensor. At the same time, the control means starts counting the exposure time. In other words, the exposure time begins to be counted from the time point when each pixel of the liquid crystal panel completely displays an image. Therefore, the exposure time is not affected even when the operating speed of each pixel of the liquid crystal panel changes with temperature and hence even when the time changes before each pixel of the liquid crystal panel completes display of an image.

As a consequence, it is possible to avoid the exposure time change which otherwise might occur due to the variation in operating speed of each pixel of the liquid crystal panel with temperature change. The quality of the image exposed can thus be stabilized.

According to an eighth aspect of the invention, there is provided an exposure control method for a photographic printer in which an image is displayed on a liquid crystal panel, light from an LED light source is irradiated on the liquid crystal panel, the image is exposed on a photosensitive material by the light transmitted through the liquid crystal panel, and the amount of light emitted from the LED light source is measured by a source light amount sensor, the method comprising the steps of emitting light by supplying a predetermined drive current $I_0$ to the LED light source, measuring a light amount $E_{ST}$ from the LED light source by the source light amount sensor, and correcting at least selected one of the current for driving the LED light source, the exposure time and the drive voltage applied to the liquid crystal panel for displaying an image, on the basis of a reference light amount $E_{SO}$ obtained when the drive current $I_0$ is supplied and the light amount $E_{ST}$ measured as above, in such a manner as to obtain exposure conditions equivalent to those for the case where the light amount from the LED light source is the reference light amount $E_{SO}$.

In the eighth aspect, light is emitted by supplying the predetermined drive current $I_0$ to the LED light source, and the light amount $E_{ST}$ from the LED light source is measured by the source light amount sensor. The reference light amount $E_{SO}$ obtained when the drive current $I_0$ is supplied and the light amount $E_{ST}$ measured as above are used to correct at least selected one of the LED light source drive current, the exposure time and liquid crystal panel drive voltage for displaying an image in such a manner as to secure exposure conditions equivalent to those for the case in which the light amount from the LED light source is the reference light amount $E_{SO}$.

As an example, in correcting the LED light source drive current, as shown in FIG. 18, a current difference $\Delta I$ corresponding to the light amount difference $(E_{ST}-E_{SO})$ is determined on a theoretical characteristic curve 150, and the curve is then shifted by an amount equivalent to the current difference $\Delta I$ (by $\Delta I$ rightward in parallel direction in FIG. 18). In this way, the characteristic of drive current versus source light amount 152 for the current environment is obtained. The characteristic curve 152 is subsequently used to represent the characteristic of drive current versus source light amount.

Also, the exposure time may be changed in such a manner as to compensate for the variations of the exposure amount (=light amount transmitted through the liquid crystal panel x exposure time) with the difference of light amounts from the light source $(E_{ST}-E_{SO})$, i.e., in such a manner as to maintain a predetermined exposure amount. As an alternative, the amount of light transmitted through the liquid crystal panel can be changed by changing the liquid crystal drive voltage and thus by changing the light transmittance of the liquid crystal panel.

In the manner described above, even when the characteristic of the LED drive current versus the source light amount changes with temperature, the characteristic of drive current versus source light amount can be smoothly corrected with reference to a point of correspondence between the drive current $I_0$ and the source light amount $E_{ST}$, and therefore a stable quality of the image exposed can be obtained.

In the fifth through eighth aspects, the characteristic of drive voltage versus transmitted light amount, the operating characteristics of the liquid crystal panel (the timing to start counting the exposure time) and the characteristic of the LED drive current versus source light amount are corrected according to a reference point based on the transmitted light amounts $E_1$, $E_2$, $E_3$ and the light amount $E_{ST}$ from the LED light source actually measured individually for each photographic printer using a light source such as an LED, a liquid crystal panel, a transmitted light amount sensor and a source light amount sensor. Even in the case where there is a considerable instrumental error due to the difference of the characteristics between photographic printers, therefore, a proper correction amount (an amount equivalent to the voltage difference $\Delta V$ in FIG. 15 or an amount corresponding to the current difference $\Delta I$ in FIG. 18, for example) can be set for each photographic printer, thereby appropriately compensating for the instrumental error in each characteristic.

DESCRIPTION OF THE PREFERRED EMBODIMENTS

Figure 1:
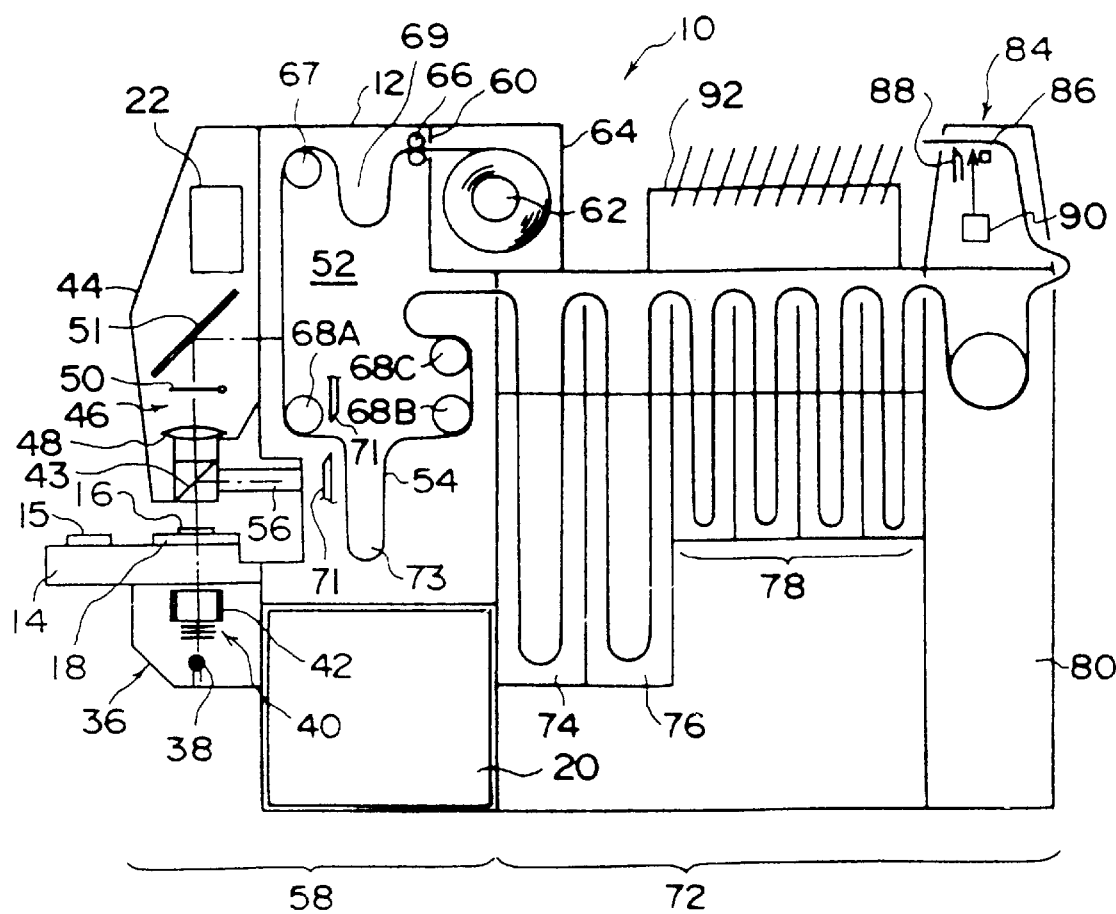
FIG. 1 is a diagram showing a general configuration of a printer processor according to an embodiment of the invention.

Embodiments of the invention will be described below with reference to the accompanying drawings.

First embodiment

A configuration of a printer processor 10 according to this embodiment will be explained with reference to FIGS. 1 and 2. The printer processor 10 covered by a casing 12 includes a printer unit 58 for exposing a main print and a subprint on the printing paper, and a processor unit 72 for performing the processes of developing, fixing, washing and drying the exposed printing paper.

First, the configuration of the printer unit 58 will be explained. The printer processor 10 has installed thereon a work table 14 projected from the casing 12 leftward in FIG. 1. A negative carrier 18 for setting a negative film 16 and a keyboard 15 by way of which the operator enters commands and data are arranged on the upper surface of the work table 14.

A main exposure light source unit 36 is arranged under the work table 14. The main exposure light source unit 36 includes a light source 38. The light emitted from the light source 38 reaches the negative film 16 set in the negative carrier 18 through a color correction (CC) filter unit 40 and a diffusion cylinder 42. The CC filter unit 40 is comprised of three filters of C (cyan), M (magenta) and Y (yellow). Each filter operates under the control of a CC filter controller 39 and is adapted to emerge on the optical axis of the light emitted from the light source 38.

Figure 2:
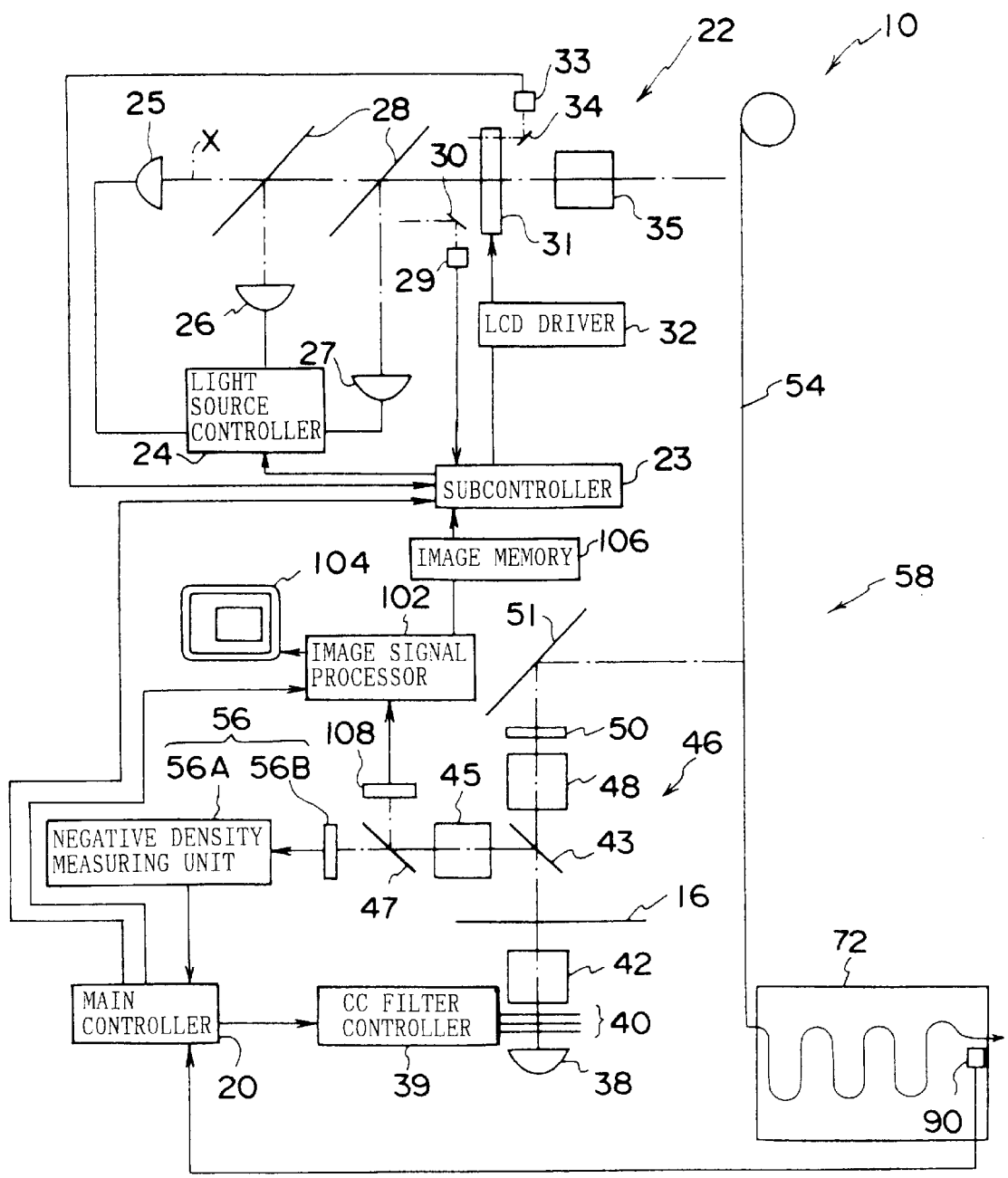
FIG. 2 is a block diagram showing a configuration of a printer unit.

A cover 44 is formed over the negative carrier (upper part in FIG. 1). The cover 44 contains therein a main exposure optical system 46 and a subprint unit 22 for exposing a subprint such as an index print.

A half mirror 43 is arranged in the lowest part of the main exposure optical system 46. This half mirror 43 is reached by the light transmitted through the negative film 16 set in the negative carrier 18. An exposure lens 48 for changing the magnification of the image exposed, a black shutter 50 for masking the exposure light and a mirror 51 for reflecting the exposure light in a substantially perpendicular direction are arranged in that order along the direction of progress of the light transmitted through the half mirror 43. The exposure light reflected from the mirror 51 is irradiated on the printing paper 54 set in an exposure chamber 52 thereby to expose the printing paper 54.

On the other hand, a photometric lens 45 for changing the magnification of the photometric image and a half mirror 47 are arranged along the direction of progress of the light reflected from the half mirror 43. A scanner 108 including an image sensor or the like is arranged along the direction in which the light is reflected from the half mirror 47. The scanner 108 is connected with an image signal processor 102 for processing in a predetermined manner the image data of each frame of the negative film 16 read by the scanner 108.

The image signal processor 102 is connected with a simulator 104 as an image display unit. A simulation image of a print produced on the basis of the conditions set for each frame image of the negative film 16 is displayed on the simulator 104.

The image signal processor 102 is also connected to an image memory 106 for storing the image data. The image signal processor 102 causes the image data of each frame of the negative film 16 read by the scanner 108 to be stored in the image memory 106.

A negative density measuring unit 56 for measuring the image density of each frame of the negative film 16 is arranged along the direction in which the light transmitted through the half mirror 47 progresses. The negative density measuring unit 56 includes a scanner 56B made up of an image sensor or the like and a negative density measuring means 56A for measuring the image density of each frame of the negative film 16 read by the scanner 56B.

The subprint unit 22 includes a light-emitting diode (hereinafter referred to as B-LED) 25 for emitting the blue light component, a light-emitting diode (hereinafter referred to as R-LED) 26 for emitting the red light component and a light-emitting diode (hereinafter referred to as G-LED) 27 for emitting the green light component as an exposure light source for the index print. The operation of these light sources is controlled by a light source controller 24. The B-LED 25 is arranged on the exposure light axis X. A pair of dichroic mirrors 28 are arranged along the direction of the light emitted from the B-LED 25 whereby the light axis of the red light component emitted from the R-LED 26 and the light axis of the green light component emitted from the G-LED 27 coincide with the exposure light axis X.

A mirror 30 is arranged at the end of the light path (a position not affecting the image) downstream of the dichroic mirrors 28 along the direction of light. A source light amount sensor 29 for measuring the amount of the light emitted from the light source is arranged along the direction in which the light is reflected from the mirror 30.

A liquid crystal panel 31 is arranged in a plane perpendicular to the exposure light axis X downstream of the mirror 30. A multiplicity of pixels capable of displaying white, black and halftones (256 tones, as an example) thereof by electrical means are arranged regularly in matrix on the image display surface of the liquid crystal panel 31. The liquid crystal panel 31 is connected to a liquid crystal panel driver 32 for driving the liquid crystal panel 31 to display an image. The liquid crystal panel driver 32 is connected to a subcontroller 23 for monitoring and controlling various processing conditions of the subprint unit 22. The image display surface of the liquid crystal panel 31 includes an image section for displaying an image to be exposed and a photometric section for measuring the amount of light transmitted through the liquid crystal panel 31. The photometric section and the image section can be driven separately from each other by the liquid crystal panel driver 32.

The subcontroller 23 is comprised of a CPU, a RAM, a ROM, an input/output controller, etc. not shown, and is connected to the image memory 106 through the input/output controller. The subcontroller 23 is for reading the image data of each frame of the negative film 16 stored in the image memory 106, forming an index image datum with a plurality of frame images arranged according to a predetermined rule, and causing the liquid crystal panel driver 32 to display an image corresponding to several frames of an index image datum, for example, an image datum portion corresponding to five frames (one line) on the liquid crystal panel 31. Also, an image corresponding to the image data of only the R, G and B color components of all the image data of the whole line may be displayed on the liquid crystal panel 31.

A mirror 34 is arranged at the end of the light path (at a position not affecting the image) downstream of the liquid crystal panel 31. A transmitted light amount sensor 33 for measuring the amount of light transmitted through the liquid crystal panel 31 is arranged along the direction in which light is reflected from the mirror 34.

An exposure lens 35 for changing the magnification of the subprint image to be exposed is arranged downstream of the mirror 34. An image of the index print displayed on the liquid crystal panel by the exposure lens 35 and projected by the exposure light is formed at a predetermined magnification on the printing paper 54.

The subcontroller 23 is connected with the light source controller 24, the source light amount sensor 29 and the transmitted light amount sensor 33. The subcontroller 23 calculates a proper correction light amount on the basis of the light amount of the R, G and B colors measured by the source light amount sensor 29. The subcontroller 23 also causes the light source controller 24 to correct the amount of light emitted from the B-LED 25, the R-LED 26 and the G-LED 27. In similar fashion, the subcontroller 23 adjusts the density of the image displayed on the liquid crystal panel 31 by controlling the liquid crystal panel driver 32 in such a manner as to attain a proper transmitted light amount on the basis of the measured transmitted light amount according to the control method of the invention as described later.

A main controller 20, which controls and monitors the overall operation of the printer processor 10 like the subcontroller 23, is arranged under the exposure chamber 52. The main controller 20 is configured of a CPU, a RAM, a ROM, an input/output controller, etc. not shown. The main controller 20 is connected to the CC filter controller 39, the negative density measuring means 56A, the image signal processor 102 and the subcontroller 23, the operation of which is monitored and controlled by the main controller 20.

A mounting unit 60 is arranged at the corner between the upper right side of the cover 44 and the upper surface of the casing 12. The mounting unit 60 has mounted thereon a paper magazine 64 for taking up and encasing the printing paper 54 on a reel 62 in layers.

A roller pair 66 is arranged in the vicinity of the mounting unit 60 and holds while transporting the printing paper to the exposure chamber 52 in horizontal position. The printing paper 54 is taken up on the roller 67 immediately before the cover 44 and changed in direction by 90 degrees downward. A first stock unit 69 for guiding the printing paper in the shape of U and keeping it in stock is interposed between the rollers 66 and the roller 67.

Rollers 68A, 68B, 68C are arranged in the lower part of the exposure section of the exposure chamber 52. The printing paper 54 printed with an image of the negative film 16 in the exposure chamber 52 is changed in direction by about 90 degrees by each of the rollers 68A, 68B and 68C and is transported to the processor unit 72 described later.

A cutter 71 is disposed downstream of the roller 68A for cutting off the rear end of the printing paper upon completion of exposure. The printing paper 54 cut off by the cutter 71 and left in the exposure chamber 52 can be wound back into the paper magazine 64 again. Also, a second stock unit 73 for guiding substantially in the shape of U and keeping in stock the printing paper 4 after printing is arranged between the roller 68A and the roller 68B. The second stock unit 73 accommodates the processing time difference between the printer unit 58 and the processor unit 72 by keeping the printing paper 54 in stock.

Now, the configuration of the processor unit 72 will be explained. The processor unit 72 includes a color developing bath 74 for storing a color developer, a bleaching-fixing bath 76 for storing a bleaching-fixing solution, and a plurality of rinse baths 78 for storing a washing solution. The printing paper 54 is developed, fixed and washed sequentially as it is transported through the color developing bath 74, the bleaching-fixing bath 76 and the rinse baths 78 in that order. The printing paper 54 washed is transported to a drying unit 80 adjacent to the rinse baths 78, where the printing paper 54 is taken up on a roller and dried by being exposed to high-temperature air.

The printing paper 54 thus dried is delivered out of the drying unit 80 at a predetermined rate while being held between a pair of rollers not shown. A cutter unit 84 is arranged downstream of the drying unit 80. The cutter unit 84 includes a cut mark sensor 86 for detecting the cut mark attached on the printing paper 54, a paper density measuring unit 90 for measuring the density of the printing paper 54 and a cutter 88 for cutting off the printing paper 54.

The cut mark sensor 86, the paper density measuring unit 90 and the cutter 88 are connected to the main controller 20. The cutter 88 of the cutter unit 84 cuts the printing paper into image frames, thereby completing photographic prints.

The photographic prints thus completed are delivered into a sorter unit 92, where they are sorted and checked in a predetermined manner. As a result of this check, inferior prints in what is called out-of-focus state are removed, while conforming photographic prints are returned to the customer with the negative film.

Now, the operation of the present embodiment will be explained.

First, the exposure process for the main print at the printer unit 58 of the printer processor 10 will be explained. With the black shutter 50 closed, the negative film 16 recorded with an image to be printed is set on the negative carrier 18 and the light source 38 is turned on. The density of the image on the negative film 16 formed by the light transmitted through the negative film 16 is measured by the negative density measuring unit 56. The image density of the negative film 16 thus measured is used by the main controller 20 to set proper exposure conditions (the amount by which each filter of the filter unit 40 is to be inserted, for example).

Then, the black shutter 50 is opened, and the image on the negative film 16 is exposed on the printing paper 54 on the basis of the exposure conditions thus set.

As the next step, in order to produce an index print of the frame images recorded in the negative film 16, one frame image of the negative film 16 is set in the negative carrier 18 and the light source 38 is turned on. The particular frame image formed by the light transmitted through the negative film 16 is read by the scanner 108, and the image data thus read is stored in the image memory 106 through the image signal processor 102. The operations of reading and processing the image are executed for each frame image of the negative film 16.

Now, explanation will be made about the process of calculating the intermediate drive voltage $V_3$ by the exposure control method according to the invention with reference to FIG. 4. This process is for calculating the intermediate transmitted light amount $E_3$ and the intermediate drive voltage $V_3$ providing a reference for calculating the offset amount of adjusting the drive voltage according to the characteristic of drive voltage versus transmitted light amount described later. This process is executed at the time of factory shipment of the printer processor 10, installation thereof in the customer's premises or the maintenance work such as changing parts of the subprint unit 22.

Figure 4:
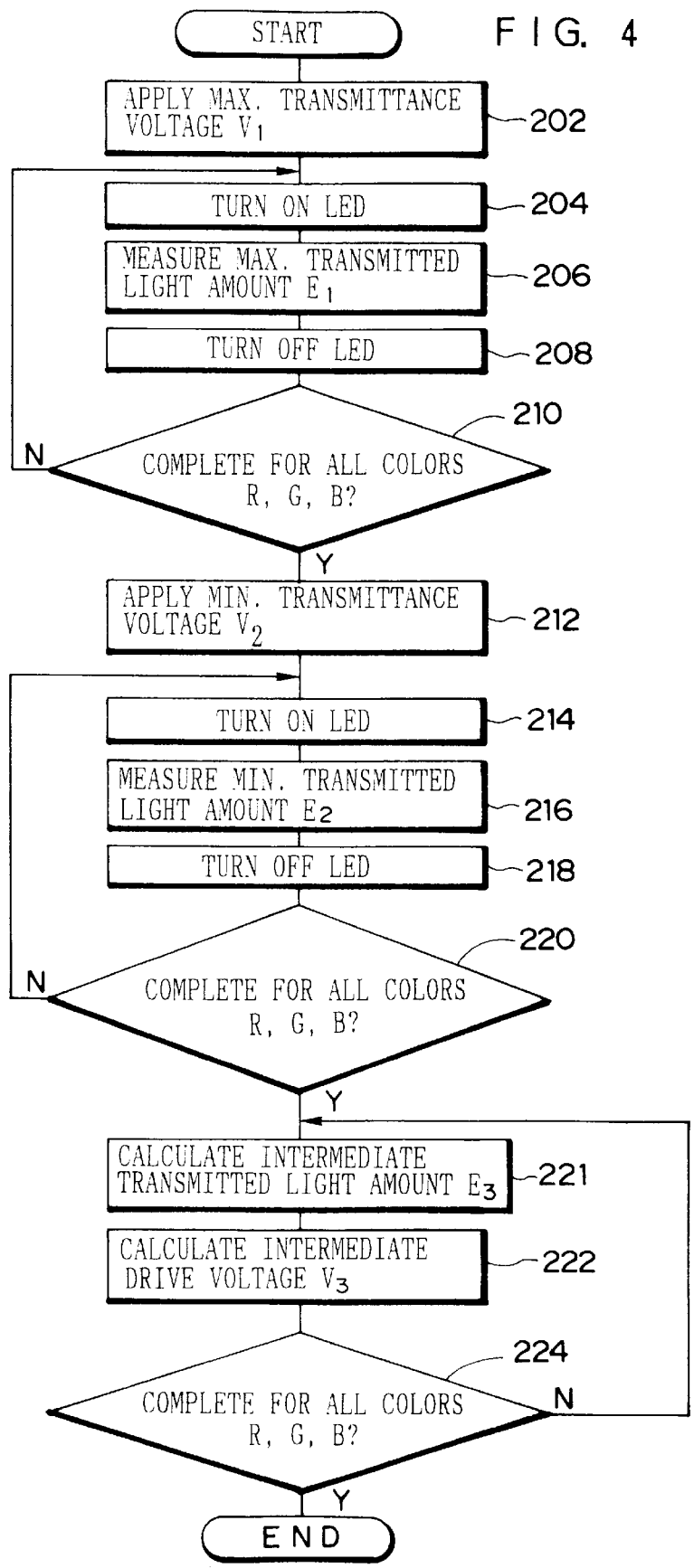
FIG. 4 is a flowchart showing the control routine for calculating an intermediate drive voltage $V_3$.

When the operator issues a command for executing the calculation of the intermediate drive voltage $V_3$ by way of the keyboard 15, the subcontroller 23 starts executing the control routine shown in FIG. 4.

Figure 3A:
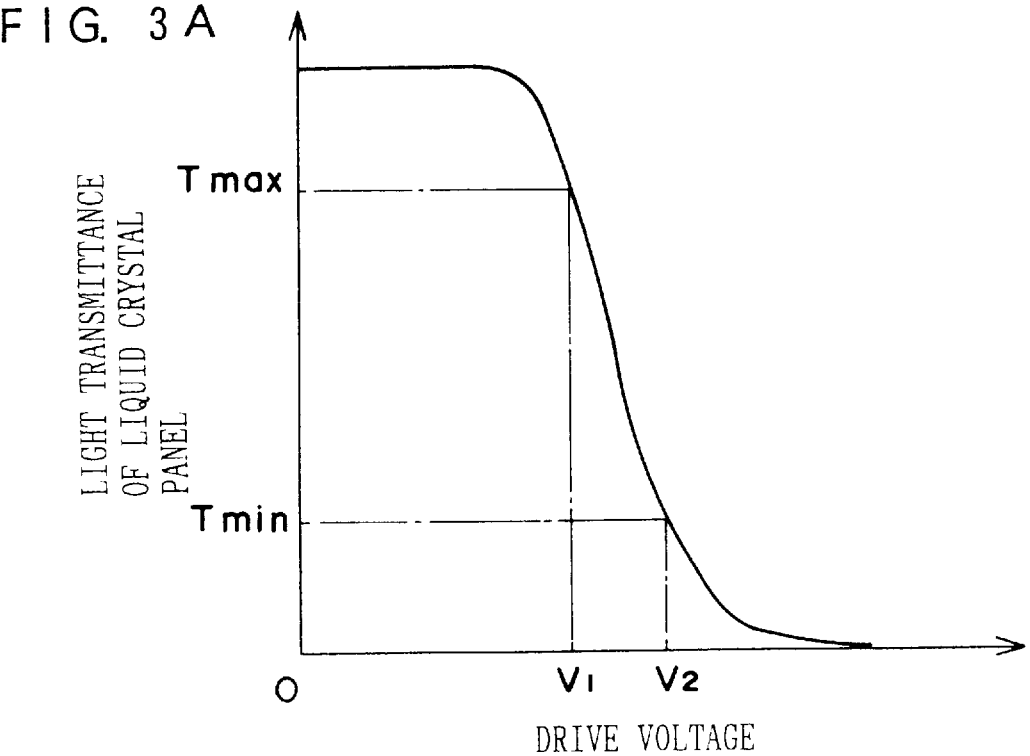
FIG. 3A is a diagram showing the characteristic of drive voltage versus transmitted light amount of a liquid crystal panel.

In step 202 of FIG. 4, the drive voltage $V_1$ corresponding to the maximum transmittance $T_{max}$ shown in FIG. 3A is applied to each pixel of the photometric section of the liquid crystal panel 31, while at the same time turning off each pixel of the image section of the liquid crystal panel 31. The next step 204 turns on the LED of any of the R, G and B colors. At this time point, the image section of the liquid crystal panel 31 is masked so that light is passed only through the photometric section. Even with the printing paper 54 set in position, therefore, the LED can be turned on.

In step 206, the transmitted light amount sensor 33 measures the transmitted light amount at this time point, i.e., the maximum transmitted light amount $E_1$ with the drive voltage $V_1$ corresponding to the maximum transmittance $T_{max}$ applied to the liquid crystal panel 31. The next step 208 turns off the LED, after which steps 204 to 208 are executed for the other colors of R, G and B.

After the process of steps 204 to 208 is completed for all the colors R, G, B in this way, the process proceeds to step 212. At this time point, the maximum transmitted light amount $E_1$ is obtained for each color R, G, B.

Step 212 applies the drive voltage $V_2$ corresponding to the minimum transmittance $T_{min}$ shown in FIG. 3A to each pixel of the photometric section of the liquid crystal panel 31 while at the same time turning off each pixel of the image section of the liquid crystal panel 31. In step 214, the LED for any of the colors R, G, B is turned on, followed by step 216 where the minimum transmitted light amount as of this timing, i.e., the minimum transmitted light amount $E_2$ with the drive voltage $V_2$ corresponding to the minimum transmittance $T_{min}$ applied to the liquid crystal panel 31 is measured by the transmitted light amount sensor 33. In the next step 218, the LED is turned off, after which steps 214 to 218 are executed for the remaining colors of R, G, B.

Upon complete execution of the process of steps 214 to 218 for all the colors of R, G, B in this way, the process proceeds to step 221. The minimum transmitted light amount $E_2$ has been obtained for each color of R, G, B by this time.

Step 221 calculates the intermediate transmitted light amount $E_3$ corresponding to the intermediate value between the maximum transmitted light amount $E_1$ and the minimum transmitted light amount $E_2$. In other words, the relation of equation (1) below is established.

$$E_3 = (E_1 + E_2)/2 \tag{1}$$

Step 222 calculates such an intermediate drive voltage $V_3$ that the transmitted light amount equal to the intermediate transmitted light amount $E_3$ calculated in step 221 may be obtained. More specifically, voltages about the middle between the drive voltages $V_1$ and $V_2$ are applied sequentially in units of predetermined voltage values to the photometric section of the liquid crystal panel 31 while measuring the transmitted light amount each time the LED is turned on. The voltage value obtained when the transmitted light amount is equal to the intermediate transmitted light amount $E_3$ is determined as the intermediate drive voltage $V_3$.

Steps 221 and 222 are executed for each of the colors R, G, B. Upon complete calculation of the intermediate drive voltage $V_3$ for all the colors R, G, B, the control routine of the FIG. 4 is terminated.

Now, the printing operation requiring temperature compensation of the characteristic of drive voltage versus transmitted light amount will be explained with reference to FIG. 5.

Figure 5:
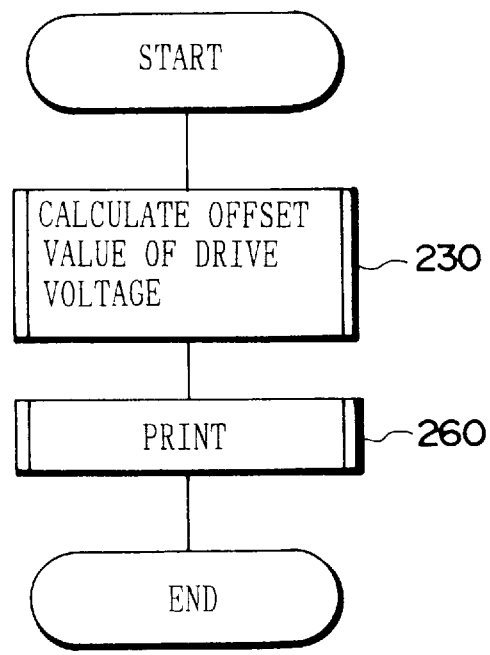
FIG. 5 is a flowchart showing the control routine for the printing operation compensating for the change with temperature of the characteristic of drive voltage versus transmitted light amount.

When the operator issues a command to execute the printing operation requiring temperature compensation of the characteristic of drive voltage versus transmitted light amount by way of the keyboard 15, the subcontroller 23 begins execution of the control routine shown in FIG. 5.

Figure 6:
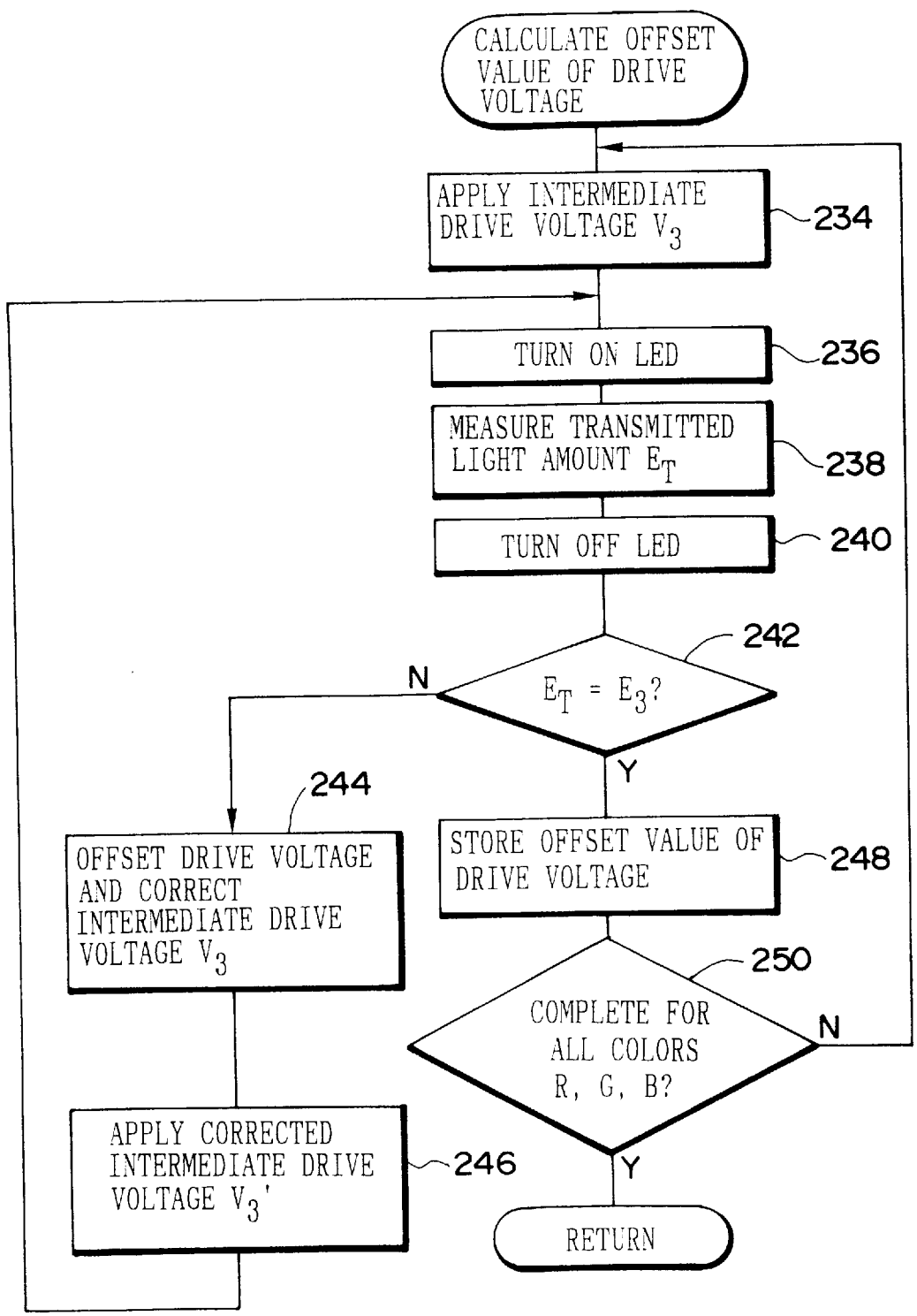
FIG. 6 is a flowchart showing the subroutine for calculating the offset value of the drive voltage.

The subroutine (FIG. 6) for calculating the amount of adjusting the drive voltage is executed in step 230 of the control routine (main routine) shown in FIG. 5. Step 234 of FIG. 6 applies the intermediate drive voltage $V_3$ calculated in step 222 to each pixel of the photometric section of the liquid crystal panel 31 while at the same time turning off each pixel of the image section of the liquid crystal panel 31. Step 236 turns on the LED associated with any of the colors R, G, B, followed by step 238 in which the transmitted light amount sensor 33 measures the transmitted light amount $E_T$ under this condition.

After the LED is turned off in step 240, step 242 decides whether the transmitted light amount $E_T$ measured in step 238 is equal to the intermediate transmitted light amount $E_3$. In the case where the transmitted light amount $E_T$ is not equal to the intermediate transmitted light amount $E_3$, the process proceeds to step 244 where the offset value of the drive voltage is adjusted in such a manner that the measured transmitted light amount $E_T$ is equal to the intermediate transmitted light amount $E_3$ on the basis of the difference between the transmitted light amount $E_T$ and the intermediate transmitted light amount $E_3$.

Figure 3B:
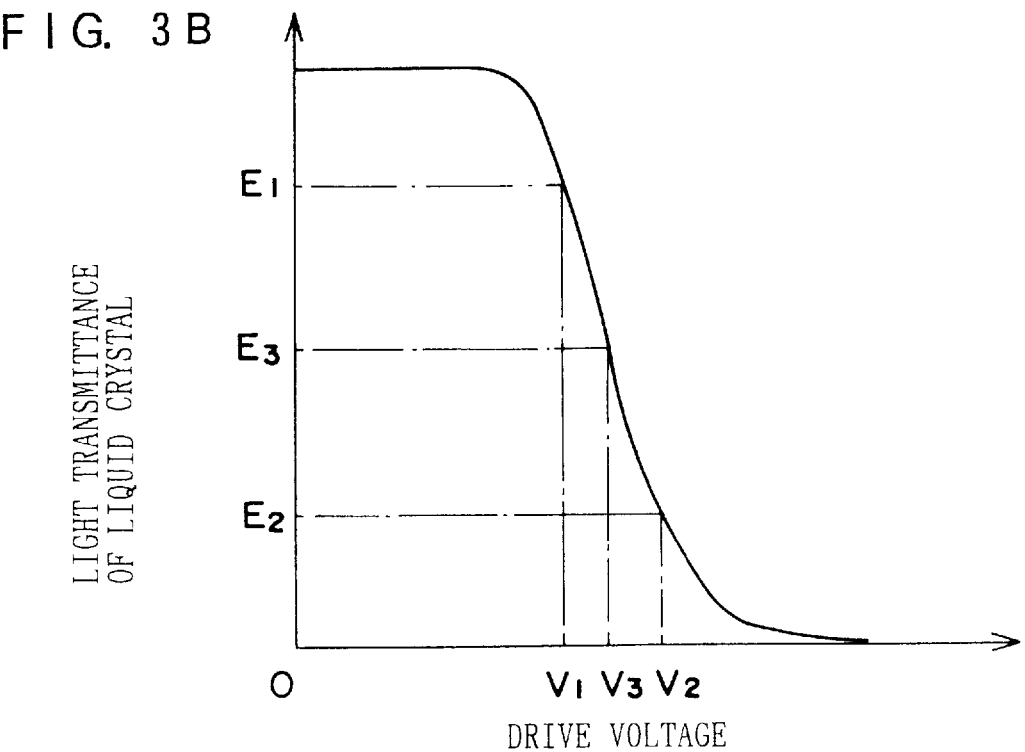
FIG. 3B is a diagram showing the characteristic of drive voltage versus transmitted light amount based on the characteristic of FIG. 3A.

In this way, according to this embodiment, as shown in FIG. 3B, the characteristic of drive voltage versus transmitted light amount (equivalent to the characteristic of drive voltage versus light transmittance) as shown in FIG. 3B is corrected on the basis of the fact that the transmitted light amount becomes equal to the intermediate transmitted light amount $E_3$ at the time of application of the intermediate drive voltage $V_3$.

Step 246 applies the corrected intermediate drive voltage $V_3$ to each pixel of the photometric section of the liquid crystal panel 31. Under this condition, the process returns to step 236 for executing steps 236 to 240 again. Step 242 decides whether the transmitted light amount $E_T$ measured once again is equal to the intermediate transmitted light amount $E_3$.

In the case where the transmitted light amount $E_T$ is not equal to the intermediate transmitted light amount $E_3$ again, the process is passed to step 244 for executing the steps including and subsequent to step 244 again.

In the case where the decision of step 242 is that the transmitted light amount $E_T$ is equal to the intermediate transmitted light amount $E_3$, on the other hand, the process proceeds to step 248 where the offset value of the drive voltage for the intermediate drive voltage $V_3$ corresponding to the transmitted light amount $E_T$ is stored in the RAM of the subcontroller 23.

The process of steps 234 to 248 described above is executed for each color of R, G, B. Upon complete execution of steps 234 to 248 for all the colors of R, G, B, the process returns to the main routine of FIG. 5.

In this way, it is possible to determine such an offset value of the drive voltage that the transmitted light amount $E_T$ is equal to the intermediate transmitted light amount $E_3$ in the temperature environment of the printing operation performed by the printer processor 10.

Figure 7:
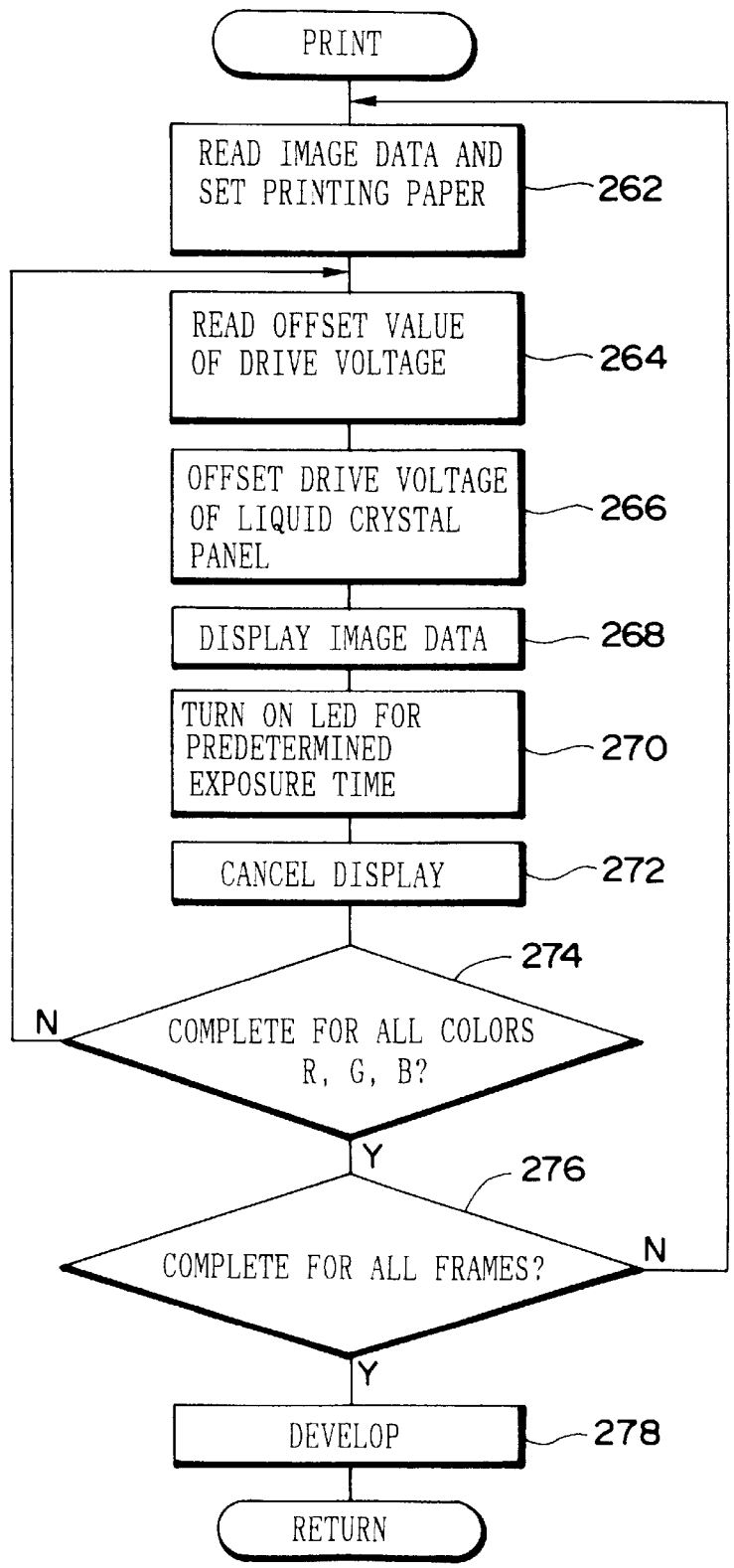
FIG. 7 is a flowchart showing the subroutine for the printing operation.

Step 260 of the main routine shown in FIG. 5 executes the subroutine (FIG. 7) for printing. In step 262 of FIG. 7, the frame image data representing several frames are read from the image memory 106, while at the same time setting the printing paper 54 in a predetermined exposure position. Step 264 reads the offset value of the reference drive voltage from the RAM of the subcontroller 23 for each of the colors R, G, B, followed by step 266 for adjusting the drive voltage on the basis of the offset value of the drive voltage.

In step 268, the image data read in step 262 is displayed on the image section of the liquid crystal panel 31 under the above-mentioned adjustment of the reference drive voltage value. Step 270 turns on the LED of the corresponding color for a predetermined exposure time, whereby exposure is conducted by the light transmitted through the image displayed on the liquid crystal panel 31. Step 272 turns off the LED, after which steps 264 to 272 are executed for the remaining colors of R, G, B.

Upon complete execution of steps 264 to 272 for all the colors R, G, B, the process proceeds to step 276 (step 274).

Step 276 decides whether all the frame images intended to produce an index print are completely exposed or not. In the case where there still remain some frame images yet to be exposed, the process returns to step 262 where several frames of unexposed frame images are exposed in steps 262 to 274.

Upon complete exposure of all the frame images, step 276 makes an affirmative decision and the process proceeds to step 278. Step 278 transports the exposed printing paper 54 through the color developing bath 74, the bleaching-fixing bath 76 and a plurality of rinse baths 78 of the processor unit 72 sequentially, thereby developing, fixing and washing the printing paper 54 in that order. The printing paper 54 thus washed is transported to the drying unit 80, where it is dried by high-temperature air. The printing paper 54 thus dried is transported to the cutter unit 84 where the printing paper is cut off into image frames by the cutter 88 thereby to produce photographic prints. The photographic prints are delivered into and sorted appropriately by the sorter unit 90.

According to the embodiment described above, both the maximum transmitted light amount $E_1$ and the minimum transmitted light amount $E_2$ are measured by the subprint unit 22, and the offset value of the drive voltage is adjusted on the basis of the intermediate transmitted light amount $E_3$ corresponding to an intermediate value between the maximum transmitted light amount $E_1$ and the minimum transmitted light amount $E_2$ on the one hand and also on the basis of the intermediate drive voltage $V_3$ corresponding to the intermediate transmitted light amount $E_3$ on the other. More specifically, the offset value of the drive voltage is adjusted on the basis of the intermediate transmitted light amount $E_3$ at an intermediate point in the range actually used for exposure, and therefore the instrumental error of the voltage-light transmittance characteristic in a predetermined range (say, voltages $V_1$ to $V_2$) can be compensated at the same time as the instrumental error of light transmittance.

Also, the drive voltage is adjusted at the time of adjusting the printer processor in such a manner that the relation between the drive voltage $V_3$ and the transmitted light amount $E_3$, which is set before displaying an image on the liquid crystal panel, remains unchanged. The variations in the voltage-light transmittance characteristic with temperature can thus be compensated.

Further, the quality of the image exposed can be stabilized by compensating for the instrumental error of light transmittance, the instrumental error of the voltage-light transmittance characteristic and the temperature variations as described above.

Furthermore, the minimum transmittance is generally zero % in many cases. In such cases, the minimum transmitted light amount is necessarily zero. Therefore, it is possible to measure only the maximum transmitted light amount $E_1$ and set the 50% value thereof as the intermediate transmitted light amount $E_2$. Also, this ratio is not limited to the aforementioned 50% of the maximum transmitted light amount $E_1$ but the ratio of about 50% or a predetermined ratio determined experimentally or empirically may be used with equal effect.

Second embodiment

The system configuration of the second embodiment is identical to that of the first embodiment and therefore will not be described.

Figure 8:
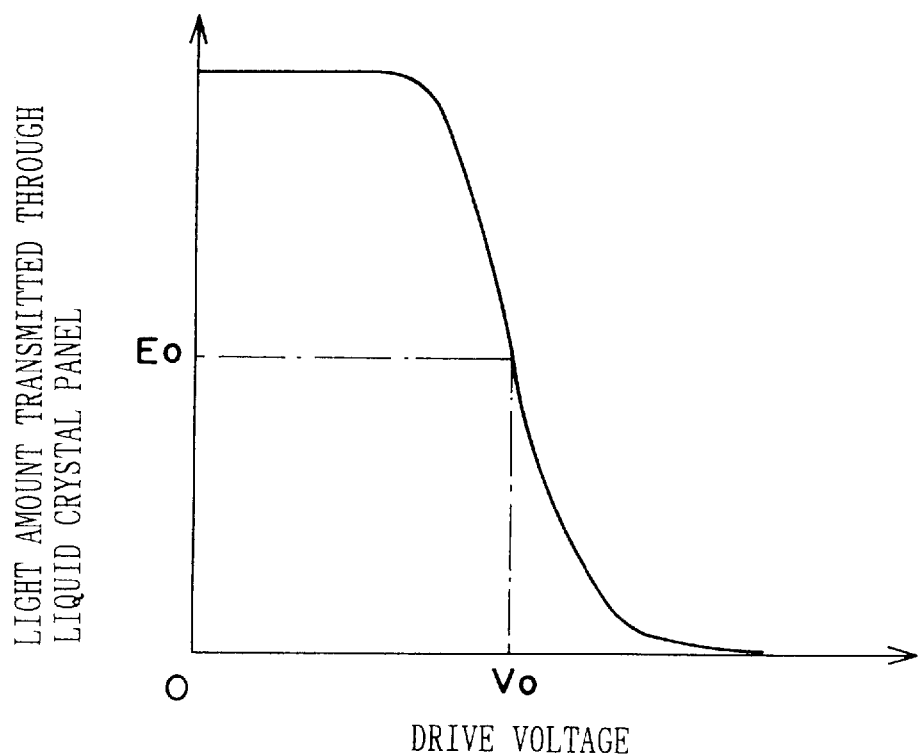
FIG. 8 is a diagram showing a predetermined reference drive voltage value $V_0$ and a predetermined reference transmitted light amount $E_0$.
Figure 9:
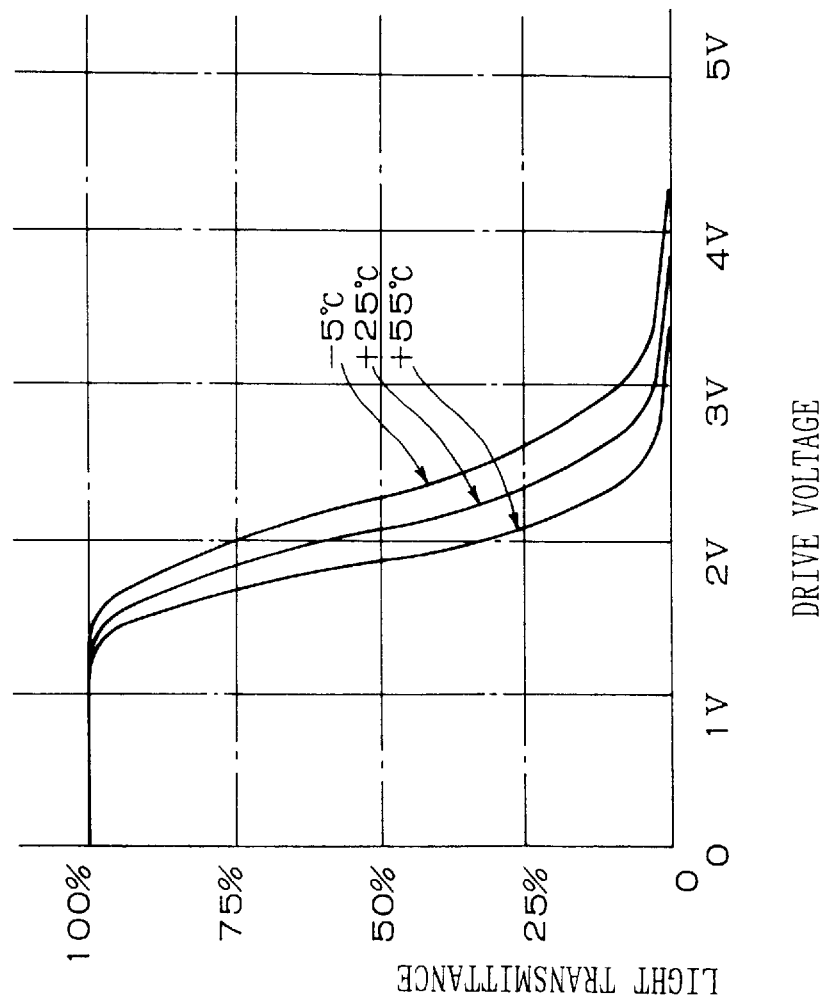
FIG. 9 is a diagram showing the characteristic of drive voltage versus light transmittance under various temperature conditions.

According to the second embodiment, a ROM built in a subcontroller 23 has prestored therein information on the transmitted light amount $E_0$ corresponding to the reference drive voltage $V_0$ described later obtained at the time of setting the printing conditions in the initial stage of introduction of a print processor 10, information on the transmitted light amounts $E_{LO}$, $E_{HO}$ measured with a low tone image and a high tone image displayed at the time of setting the printing conditions, and information on the theoretical characteristic curve 140 of drive voltage versus transmitted light amount shown in FIG. 8.

Now, the operation of the present embodiment will be explained.

First, the exposure process for the main print by the printer unit 58 of the printer processor 10 will be explained. With a black shutter 50 closed, a negative film 16 recorded with an image to be printed is set in a negative carrier 18, and a light source 38 is turned on. The density of then image of the negative film 16 formed by the light transmitted through the negative film 16 is measured by a negative density measuring unit 56. On the basis of the image density of the negative film 16 thus measured, proper exposure conditions (such as the amount by which each filter of a filter unit 40 is inserted) are set by a main controller 20. Then, the black shutter 50 is opened, and the image of the negative film 16 is exposed on printing paper 54 on the basis of the exposure conditions set as above.

Next, in order to produce an index print of the frame images recorded in the negative film 16, one frame image of the negative film 16 is set in the negative carrier 18 and the light source 38 is turned on. The frame image formed by the light transmitted through the negative film 16 is read by a scanner 108, and the image data thus read is stored in an image memory 106 by means of an image signal processor unit 102. This image reading and processing operation is executed for each frame image of the negative film 16.

Now, explanation will be made about the exposure process for a subprint by the printer unit 58. When the operator issues a command to execute the printing process for an index print requiring correction for temperature compensation by means of a keyboard 15 at the start of the day, the subcontroller 23 begins executing the control routine shown in FIG. 10.

Figure 10:
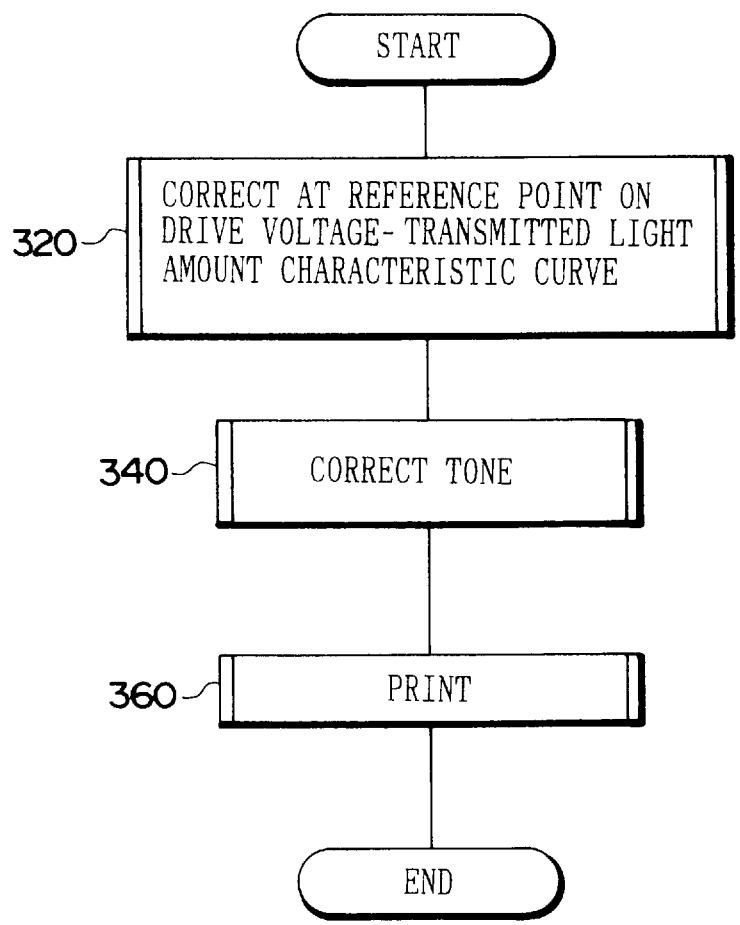
FIG. 10 is a flowchart showing the control routine executed by a subcontroller according to the first embodiment.

In step 320 of FIG. 10, the subroutine for correction at a reference point on the characteristic curve of drive voltage versus transmitted light amount of the liquid crystal panel 31 (FIG. 11) is executed. Step 322 of FIG. 11 applies a predetermined drive voltage $V_0$ for displaying a halftone (128th one of 256 tones) to a specific area of the image display surface of the liquid crystal panel 31 through which the light measured by the transmitted light amount sensor 33 is transmitted. As a result, a halftone image is displayed in the specific area of the liquid crystal panel 31.

Figure 14:
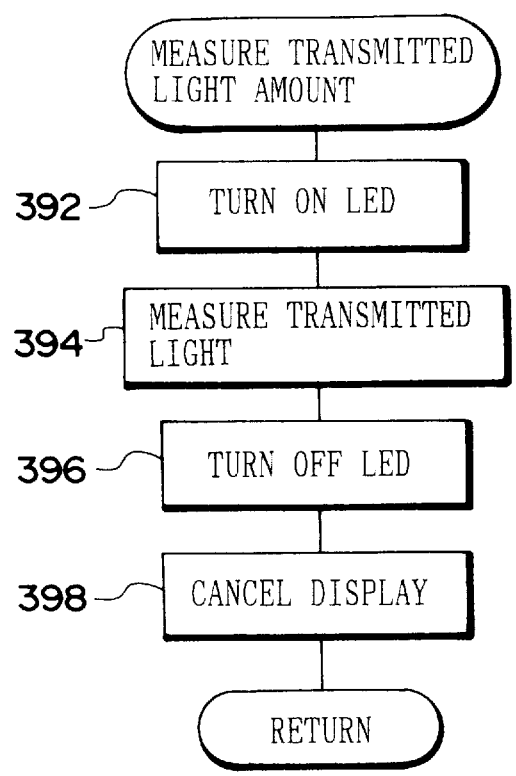
FIG. 14 is a flowchart showing the subroutine for measuring the transmitted light amount.

The next step 324 executes the subroutine of measuring the transmitted light amount (FIG. 14). Step 392 of FIG. 14 turns on the LED for any of the colors R, G, B, followed by step 394 for measuring the transmitted light amount $E_1$ by the transmitted light amount sensor 33. After complete measurement of the transmitted light amount $E_1$, the LED is turned off and the halftone image display on the liquid crystal panel 31 is cancelled. The process thus returns to the subroutine of FIG. 11.

Figure 11:
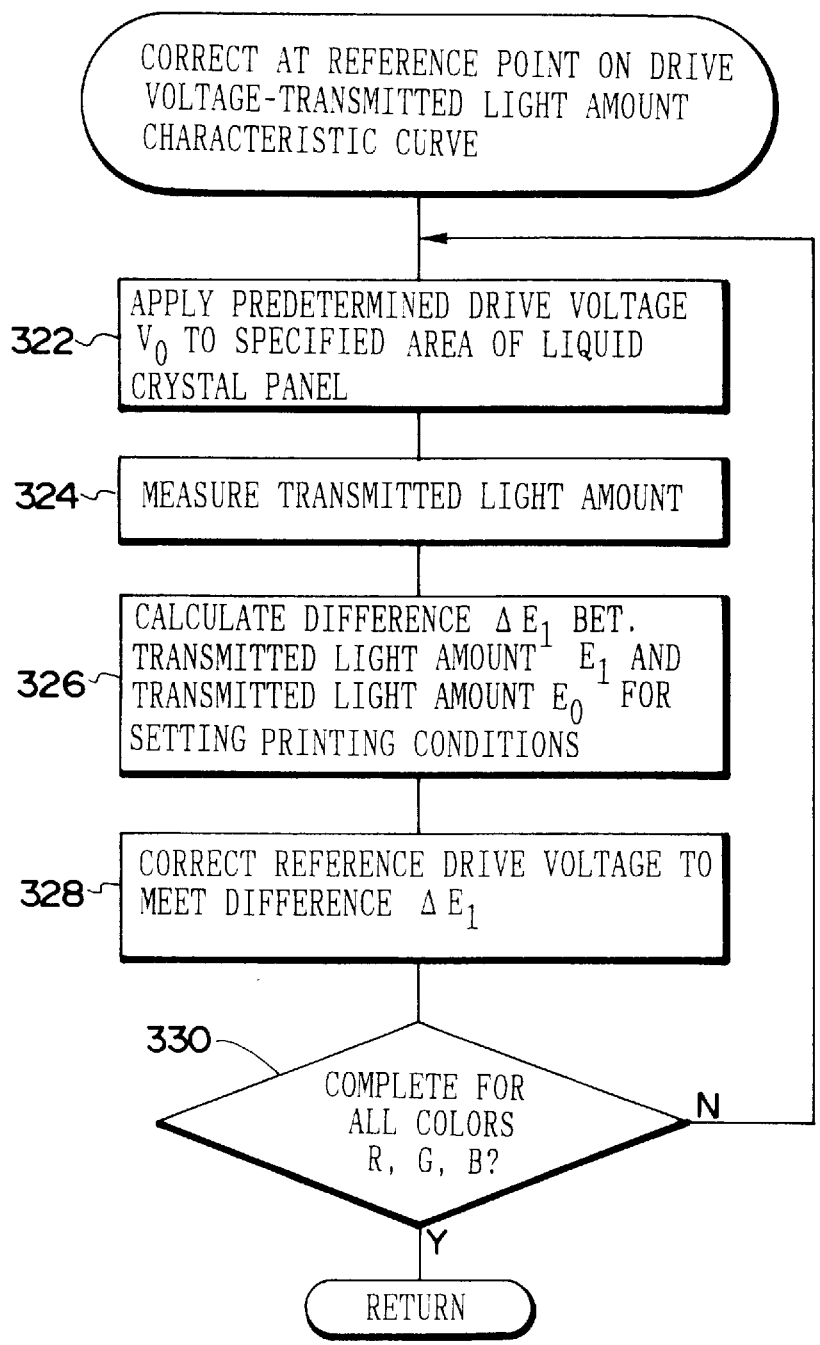
FIG. 11 is a flowchart showing the subroutine for correction at a reference point on the characteristic curve of drive voltage versus transmitted light amount.

In step 326 of FIG. 11, the same predetermined drive voltage $V_0$ is applied to each pixel of the liquid crystal panel 31 at the time of setting the printing conditions in the initial stage of introduction of the printer processor 10. The value $E_0$ prevailing at the time of measuring the transmitted light amount is read from the ROM of the subcontroller 23, so that the light amount difference $\Delta E_1$ between the transmitted light amount value $E_0$ and the measured transmitted light amount $E_1$ is calculated.

Figure 15:
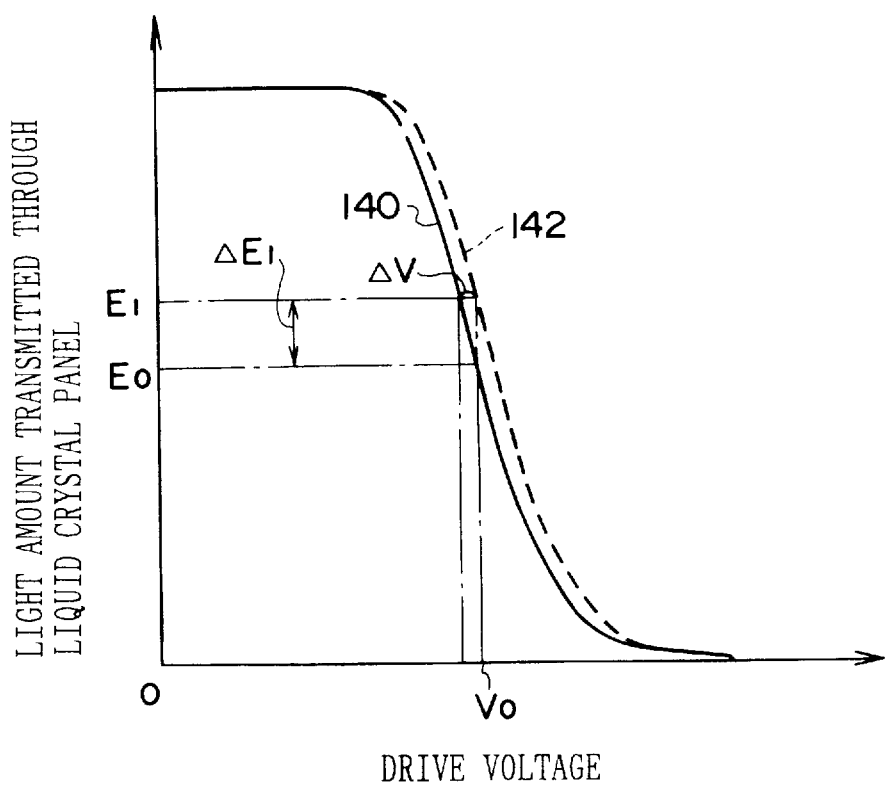
FIG. 15 is a diagram showing the characteristic of drive voltage versus transmitted light amount for a liquid crystal panel.

Step 328 corrects a reference drive voltage value corresponding to the difference $\Delta E_1$ in the manner described below. As shown in FIG. 15, a voltage difference $\Delta V$ corresponding to the light amount difference $\Delta E_1$ is determined on the theoretical characteristic curve 140 of drive voltage versus transmitted light amount, and the characteristic curve 140 is shifted by an amount equivalent to this voltage difference $\Delta V$ (in parallel direction rightward in FIG. 15), thereby producing the characteristic curve 142 of drive voltage versus transmitted light amount in the same environment. Subsequently, the characteristic curve 142 is used as a graph representing the characteristic of drive voltage versus transmitted light amount.

The process of steps 322 to 328 are executed subsequently for the remaining colors of R, G, B. When the process of steps 322 to 328 is complete for all the colors of R, G, B, the process returns to the main routine shown in FIG. 3.

Figure 12:
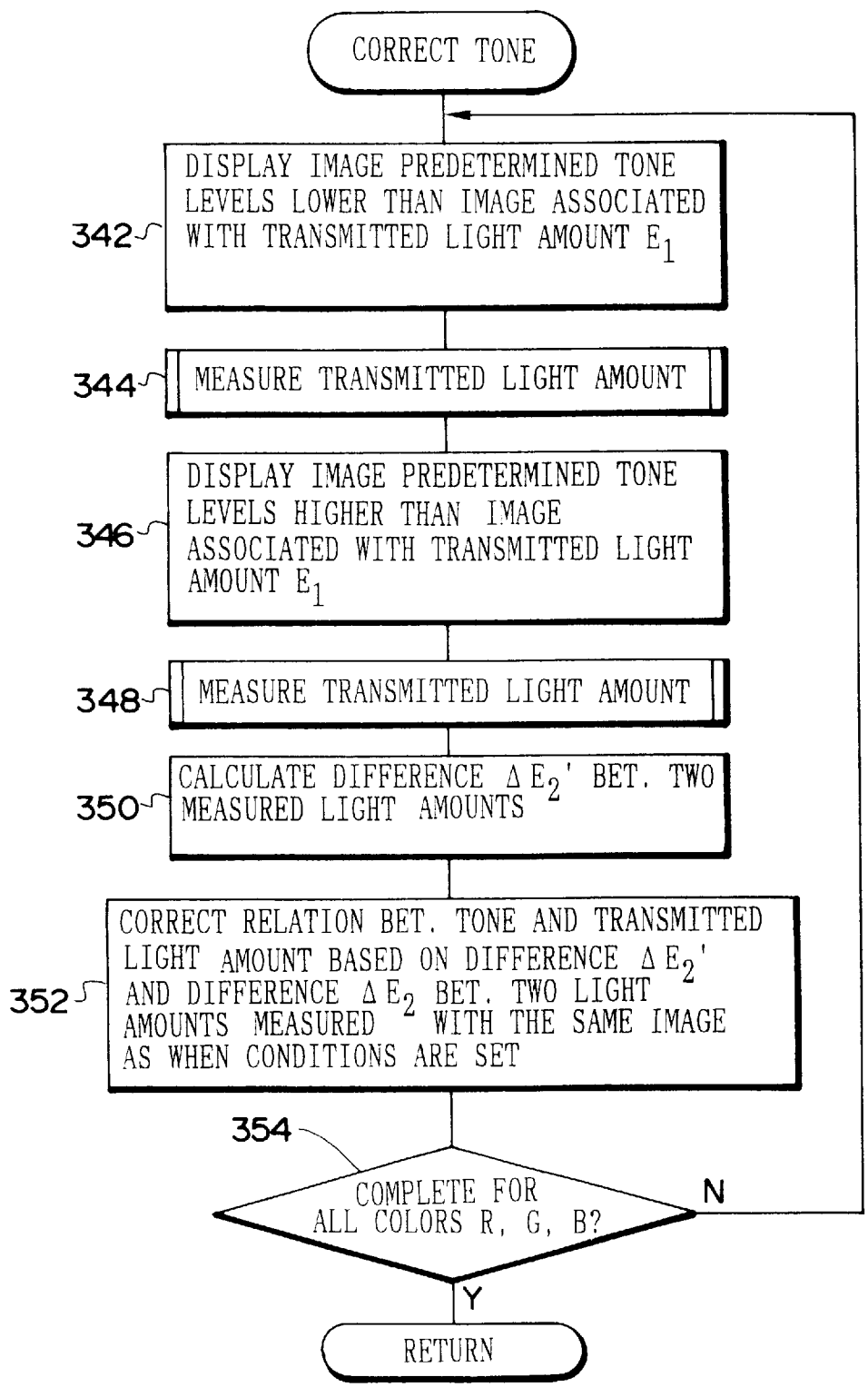
FIG. 12 is a flowchart showing the subroutine for tone correction.

In step 340 of FIG. 10, the subroutine for tone correction is executed (FIG. 12). Step 342 of FIG. 12 displays in the specific area of the liquid crystal panel 31 an image of a tone a predetermined number of levels lower than the halftone (hereinafter referred to as the low tone image) associated with the transmitted light amount $E_1$ obtained in the correction process at a reference point on the characteristic curve of drive voltage versus transmitted light amount of step 320 described above. Then in step 344, the subroutine for measuring the transmitted light amount (FIG. 14) is executed thereby to measure the amount of the light $E_L$ transmitted through the low tone image.

In the next step 346, an image a predetermined number of levels higher than the halftone image associated with the transmitted light amount $E_1$ (hereinafter referred to as the high tone image) is displayed in the specific area of the liquid crystal panel 31. In step 348, the subroutine for measuring the transmitted light amount described above (FIG. 14) is executed thereby to measure the amount of light $E_H$ transmitted through the high tone image.

In step 350, the light amount difference $\Delta E_2'$ between the two transmitted light amounts $E_L$ and $E_H$ measured is calculated, followed by step 352 for reading from the ROM of the subcontroller 23 the light amount difference $\Delta E_2$ between the two transmitted light amounts $E_{LO}$ and $E_{HO}$ measured with the same image as in the above-mentioned case at the time of setting the printing conditions in the initial stage of introduction of the printer processor 10. On the basis of the light amount difference $\Delta E_2$ and the light amount difference $\Delta E_2'$ thus calculated, the relation between the tone and the transmitted light amount is corrected in the manner mentioned below.

The light amount difference $\Delta E_2$ corresponding to a difference $\Delta LVL$ has so far been regarded to occur between the tone level of the image displayed in step 342 and the tone level of the image displayed in step 346, i.e., one tone level has so far been regarded to correspond to the light amount difference $\Delta E_2/\Delta LVL$. Now, the light amount difference for one tone level is corrected to $\Delta E_2'/\Delta LVL$.

Steps 342 to 352 are subsequently executed for the remaining colors of R, G, B. Upon complete execution of steps 342 to 352 for all the colors of R, G, B, the process returns to the main routine of FIG. 10.

Figure 13:
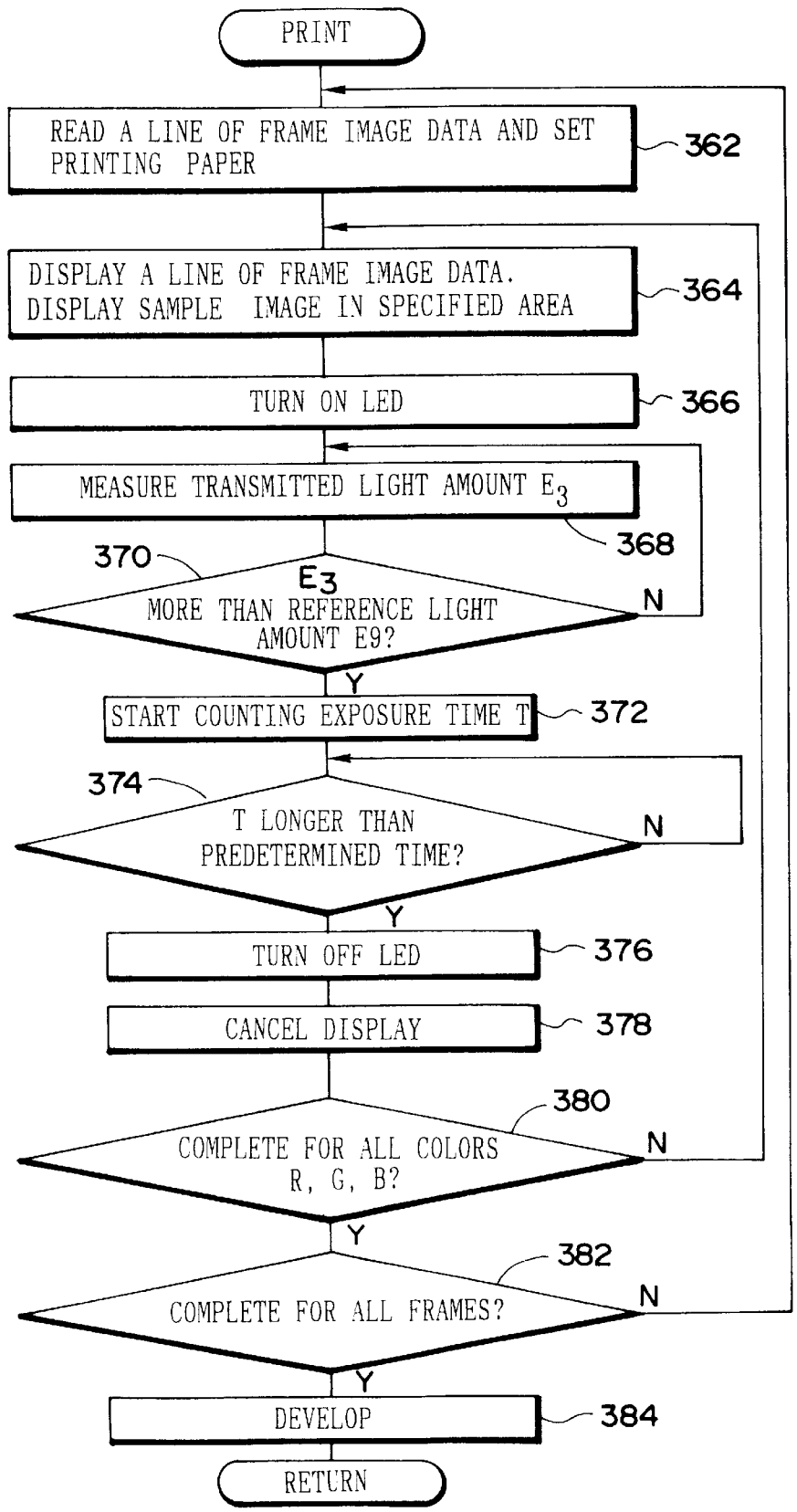
FIG. 13 is a flowchart showing the subroutine for the printing operation.

In step 360 of FIG. 10, the printing subroutine (FIG. 13) is executed. In step 362 of FIG. 13, a line of frame image data (five frames, for example) in an index print is read from the image memory 106 while at the same time setting the printing paper 54 in a predetermined exposure position. Step 364 displays a line of frame image data on the liquid crystal panel 31 according to the characteristic of drive voltage versus transmitted light amount and the tone characteristic corrected by the subroutine of steps 320 and 340 for any of the colors R, G, B, and at the same time displays a sample image of a predetermined density in the specific area of the liquid crystal panel 31.

In step 366, the LED corresponding to the color of the image displayed is turned on, followed by step 368 for measuring the transmitted light amount $E_3$ by the transmitted light amount sensor 33. Step 370 decides whether the transmitted light amount $E_3$ is equal to or more than the reference light amount E9 providing a basis on which to decide that the liquid crystal panel 31 is turned on as predetermined.

In the case where the transmitted light amount $E_3$ is less than the reference light amount E9, the image display is regarded to have yet to be completed on the liquid crystal panel 31, and step 370 makes a negative decision. The process thus returns to step 368 for measuring the transmitted light amount $E_3$ again. When the image display on the liquid crystal panel 31 is complete with the transmitted light amount $E_3$ exceeding the reference light amount $E_3$, on the other hand, step 370 makes an affirmative decision and the process proceeds to step 372 thereby to start counting the exposure time T.

Until the exposure time exceeds a predetermined time length in step 374, a line of the frame image data displayed in step 364 continues to be exposed. Upon complete exposure for the predetermined length of time, the LED is turned off (step 376), and the image display on the liquid crystal panel 31 is cancelled (step 378).

According to this embodiment, the exposure time begins to be counted from the time of complete image display by each pixel of the liquid crystal panel 31. As a result, even when the operating speed of each pixel of the liquid crystal panel changes with temperature and hence the time before complete image display by each pixel of the liquid crystal panel undergoes a change, the exposure time is not affected. Consequently, the exposure time can be prevented from changing with the operating speed of each pixel of the liquid crystal panel which may change with temperature variations. The quality of the image exposed can thus be stabilized.

Steps 364 to 378 are executed subsequently for the remaining colors of R, G, B. Upon complete execution of the process for all the colors of R, G, B, the process proceeds to step 382.

Step 382 decides whether all the frame images intended to constitute an index print have been completely exposed. In the case where there still remain frame images not exposed, the process returns to step 362, and steps 362 to 380 are executed for exposing the next line (five frames) of frame images not yet exposed.

Upon complete exposure of all the frame images, step 382 makes an affirmative decision and the process is passed to step 384. Step 384 transports the exposed printing paper through a color developing bath 74, a bleaching-fixing bath 76 and a plurality of rinse baths of the processor unit 72 thereby to develop, fix and wash the printing paper 54 sequentially. The printing paper 54 thus washed is transported to a drying unit 80, where it is dried in high-temperature air. The printing paper 54 thus dried is transferred to a cutter unit 84, where it is cut by a cutter 84 into image frames to produce photographic prints. The photographic prints are delivered to a sorter unit 90 where they are sorted appropriately.

According to the above-mentioned embodiments, the characteristic of drive voltage versus transmitted light amount, which may change with temperature, can be corrected with reference to a point of correspondence between the drive voltage $V_0$ and the transmitted light amount $E_1$. Also, the reference for this correction is provided by a tone level at an intermediate point. The error of the characteristic of drive voltage versus transmitted light amount can thus be reduced equally in both the high tone level and the low tone level, thereby attaining a correction of higher accuracy.

Also, even when the relation between the tone and the transmitted light amount (corresponding to the inclination of the characteristic curve of drive voltage versus transmitted light amount) changes with temperature, the tone correction process (FIG. 12) can successfully correct the change. It is thus possible to correct the characteristic of drive voltage versus transmitted light amount with high accuracy.

In view of the fact that an index print is printed while conducting the above-mentioned correcting process with such a high accuracy, a stable quality of the index print produced is assured.

The correcting process of steps 320, 340 is executed at such time intervals as to permit compensation for temperature changes, for example, at the rate of several times a day or about once before printing every one lot or one unit.

Figure 18:
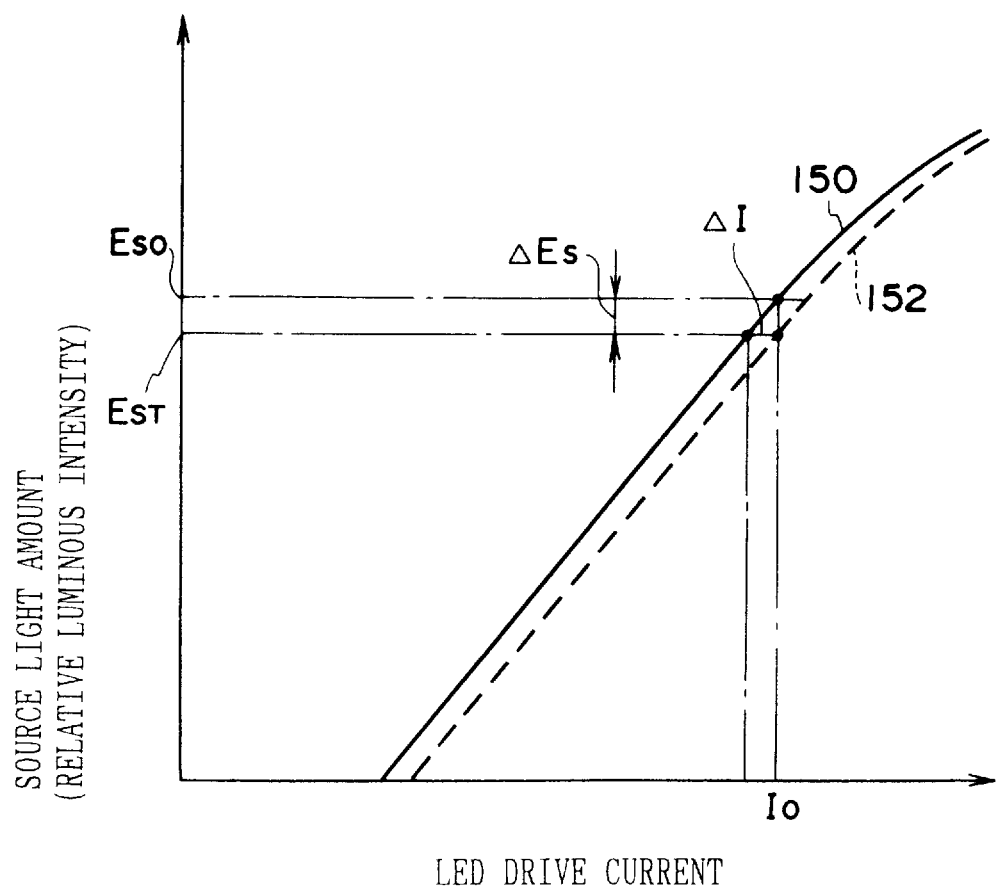
FIG. 18 is a diagram showing the characteristic of drive voltage versus source light amount of an LED.

Also, the characteristic curves of FIGS. 15 and 18 may represent actual measurements of characteristic values taken under predetermined conditions instead of theoretical values.

Third embodiment

A third embodiment of the invention will be explained. According to the third embodiment, the variation in the source light amount of an LED due to temperature changes or the like is corrected, for example.

The configuration of the third embodiment is substantially identical to that of the second embodiment described above, and the same component parts as the corresponding parts of the embodiments are designated by the same reference numerals, respectively, and will not be described any further. About the only difference of the present embodiment, however, is that the ROM built in the subcontroller 23 has prestored therein information on the source light amount $E_{SO}$ obtained at the time of turning on each LED by a reference drive current IO supplied thereto when the printing conditions are set in the initial stage of introduction of the printer processor 10 and information on the theoretical characteristic curve 150 of drive current versus source light amount for each LED as shown in FIG. 18.

Now, the operation of the third embodiment will be explained with reference to FIGS. 16 to 18. The same steps as the corresponding ones of the second embodiment are designated by attaching a suffix "A" to each step number, and will not be described in detail.

Figure 16:
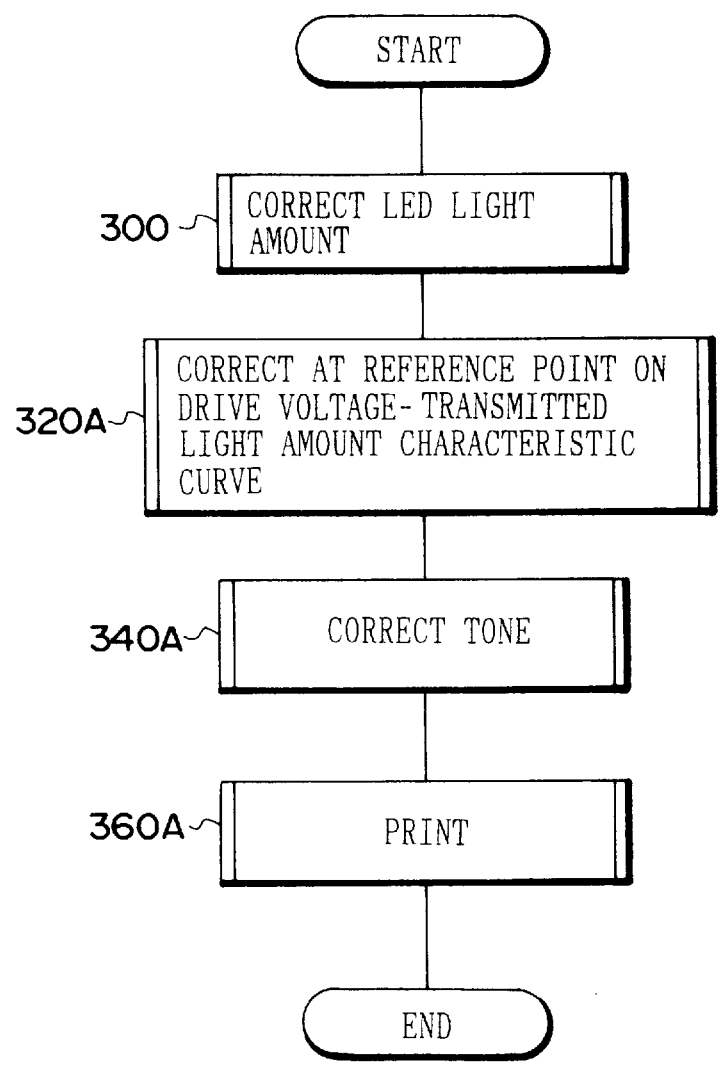
FIG. 16 is a flowchart showing the control routine executed by a subcontroller according to a second embodiment.

According to the third embodiment, as shown by the main routine of FIG. 16, the subroutine for LED light amount correction of step 320 is executed before steps 320A to 360A described in the second embodiment. The only difference of the third embodiment is that the LED light amount correction of step 320 is added. Only the LED light amount correction, therefore, will be explained below.

Figure 17:
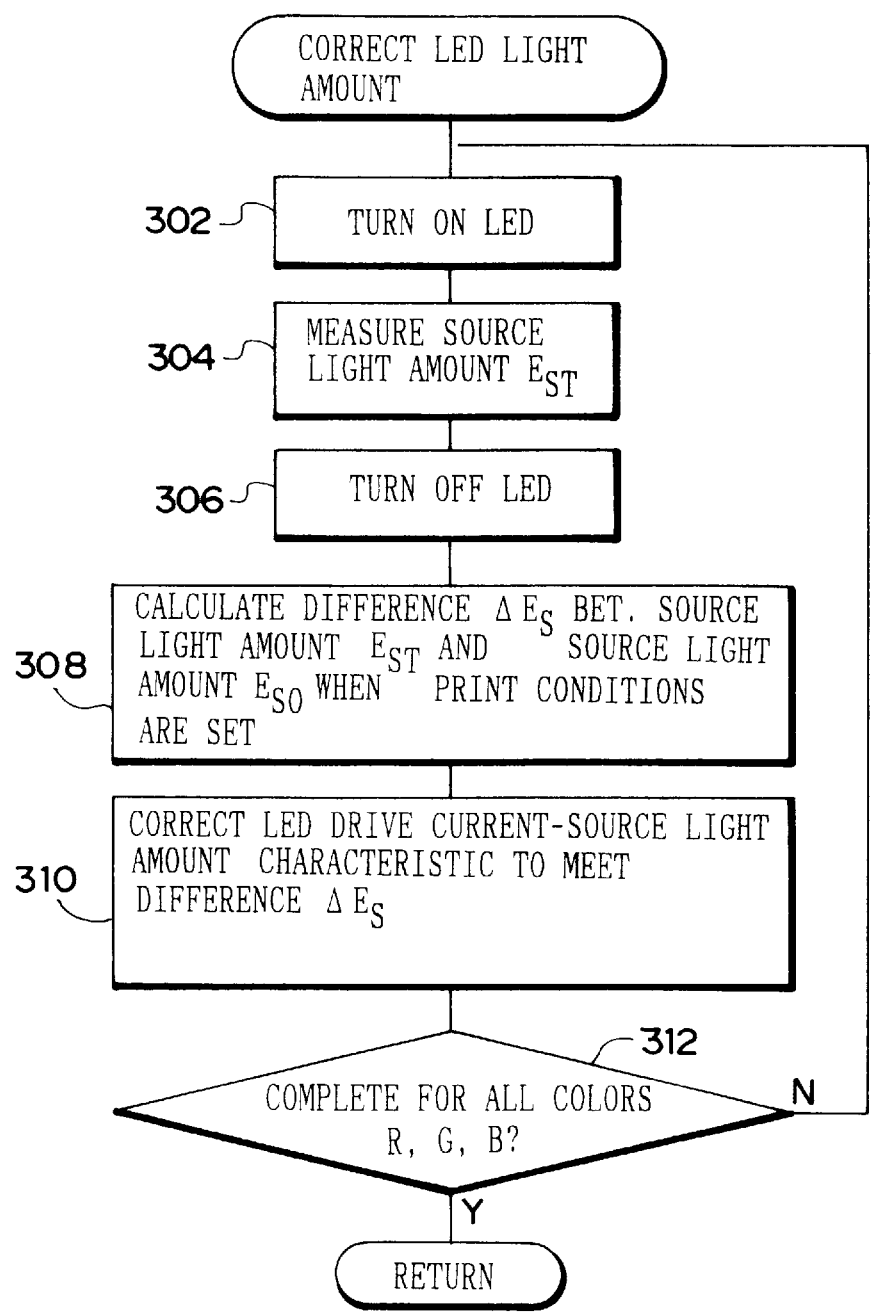
FIG. 17 is a flowchart showing the subroutine for correcting the LED light amount.

In step 302 shown in FIG. 17, a predetermined drive current $I_0$ is supplied to an LED for any of the colors R, G, B thereby to turn on the particular LED. In the next step 304, the source light amount $E_{ST}$ of the same LED is measured by the source light amount sensor 29.

After complete measurement, step 306 turns off the LED. Step 308 reads from the ROM of the subcontroller 23 the source light amount $E_{SO}$ measured at the time of turning on the LED supplied with the same predetermined drive current IO as in the previous case when the printing conditions are set in the initial stage of introduction of the printer processor 10. Then the difference $\Delta E_S$ between the source light amount $E_{SO}$ and the source light amount measurement $E_{ST}$ is calculated.

Step 310 corrects the LED characteristic of drive current versus source light amount corresponding to the light amount difference $\Delta E_S$ in the manner described below. As shown in FIG. 18, the current difference $\Delta I$ corresponding to the light amount difference $\Delta E_S$ is determined on the theoretical characteristic curve 150 of drive current versus source light amount, which characteristic curve 150 is shifted by an amount equivalent to the current difference $\Delta I$ (by $\Delta I$ rightward in parallel direction in FIG. 18). The characteristic curve 152 of drive current versus source light amount for the prevailing environment can thus be obtained. The characteristic curve 152 is subsequently used as a graph representing the characteristic of drive current versus source light amount.

Steps 302 to 310 are executed for the remaining colors of R, G, B. When the process of steps 302 to 310 are complete for all the colors of R, G, B, the process returns to the main routine of FIG. 10.

After that, as in the second embodiment, the characteristic of drive voltage versus transmitted light amount and the tone of the liquid crystal panel 31 are corrected according to the main routine of FIG. 10. Finally, step 360A executes the process for printing an index print.

According to the third embodiment described above, the LED characteristic of drive voltage versus source light amount, which may change with temperature, can be smoothly corrected on the basis of a point of correspondence between the drive current IO and the source light amount $E_{ST}$.

As described above, an index print is produced with the characteristic of drive current versus source light amount corrected for each LED in this way. Therefore, the quality of the index print produced is stabilized.

Although the third embodiment represents a case in which the LED characteristic of drive current versus source light amount is corrected in order to compensate for the variations of the same characteristic with temperature, the present invention is not limited to such a case, but the time of exposure by the light from an LED or the drive voltage applied to the liquid crystal panel for displaying an image to be exposed by the light from the LED can be corrected as an alternative.

Also, the LED light amount correction of step 300 of FIG. 16, like the corresponding correction steps of 320A and 340A, can be carried out at such time intervals as to permit compensation for temperature variations.

Further, apart from the first, second and third embodiments representing applications of the invention to a printer processor having a subprint unit, the invention is applicable with equal effect to a photographic print system configured of an index printer and a paper process independent of each other or a liquid crystal photographic printer comprising an image memory, a liquid crystal panel for displaying the image data stored in the image memory and an exposure system capable of exposing the image displayed on the liquid crystal panel.

What is claimed is:

1. In a photographic printer for displaying an image on a liquid crystal panel by irradiating light from a light source on said liquid crystal panel and exposing said image on a photosensitive material by the light transmitted through said liquid crystal panel, a method for controlling an exposure comprising:

determining a respective drive voltage $V_0$ of said liquid crystal panel by measuring, before displaying an image on said liquid crystal panel, a maximum transmitted light amount $E_1$ of the liquid crystal panel associated with a drive voltage $V_l$ applied to each pixel of said liquid crystal panel for producing a maximum transmitted light amount for each pixel of said liquid crystal panel, are determining said respective drive voltage $V_0$ of said liquid crystal panel as a voltage at which said liquid crystal panel provides a reference transmitted light amount $E_0$ smaller than said measured maximum transmitted light amount $E_1$; and determining, for said liquid crystal panel, a temperature-compensated offset drive voltage at which said liquid crystal panel, when driven, provides said reference transmitted light amount $E_0$ by driving said liquid crystal panel at said respective drive voltage $V_0$ and measuring a resulting transmitted light amount, comparing said resulting transmitted light amount with said reference transmitted light amount $E_0$, and offsetting said respective drive voltage $V_0$ based on said comparison to provide said temperature-compensated offset drive voltage.

2. In a photographic printer for displaying an image on a liquid crystal panel, irradiating light from a light source on said liquid crystal panel and exposing said image on a photosensitive material by the light transmitted through said liquid crystal panel, a method for controlling an exposure comprising the steps of:

measuring, before displaying an image on said liquid crystal panel, a maximum transmitted light amount $E_1$ associated with a drive voltage $V_1$ applied to each pixel of said liquid crystal panel for producing a maximum light transmittance of each pixel of said liquid crystal panel and a minimum transmitted light amount $E_2$ of said liquid crystal panel associated with a drive voltage $V_2$ applied to each pixel of said liquid crystal panel for producing a minimum light transmittance of each pixel of said liquid crystal panel;

determining an intermediate transmitted light amount $E_3=(E_1+E_2)/2$ between the maximum transmitted light amount $E_1$ and the minimum transmitted light amount $E_2$ measured and an intermediate drive voltage $V_3$ obtaining said intermediate transmitted light amount $E_3$; and adjusting an offset value of the drive voltage V to be applied to each pixel of said liquid crystal panel on the basis of the fact that the intermediate transmitted light amount $E_3$ can be obtained as a value corresponding to said intermediate drive voltage $V_3$.

3. A method according to claims 2, further comprising the steps of:

measuring the transmitted light amount associated with a reference drive voltage applied at the time of adjusting the photographic printer for compensating for temperature changes; and adjusting an offset value of the drive voltage to be applied to each pixel of said liquid crystal panel on the basis of the measured transmitted light amount and the reference transmitted light amount in such a manner that the relation between the drive voltage V and the transmitted light amount E of said liquid crystal panel set before image display on said liquid crystal panel remains unchanged.

4. In a photographic printer for displaying an image on a liquid crystal panel irradiating light from a light source on said liquid crystal panel and exposing said image on a photosensitive material by the light transmitted through said liquid crystal panel, a method for controlling an exposure comprising:

determining a respective drive voltage $V_4'$ by measuring, before displaying an image on said liquid crystal panel, the actual drive voltage at which said liquid crystal panel provides a predetermined transmitted light amount $E_4$; and determining, for said liquid crystal panel, a temperature-corrected offset drive voltage at which said liquid crystal panel, when driven, provides said predetermined transmitted light amount $E_4$ by offsetting said respective drive voltage $V_4'$ on the basis of a difference said respective drive voltage $V_4'$ and a theoretical drive voltage $V_4$ for producing said predetermined transmitted light amount $E_4$.

5. In a photographic printer comprising a transmitted light amount sensor for measuring the amount of light transmitted through a liquid crystal panel, wherein an image is displayed on the liquid crystal panel, the light from a light source is irradiated on said liquid crystal panel and said image is exposed on a photosensitive material by the light transmitted through said liquid crystal panel, a method for controlling an exposure comprising the steps of:

applying a predetermined drive voltage $V_0$ and producing a substantial halftone in at least a specified partial area of said liquid crystal panel;

irradiating said specified area;

measuring, with said transmitted light amount sensor, a light amount $E_1$ when said liquid crystal panel is driven at predetermined drive voltage $V_0$; and correcting the relation between a drive voltage and a transmitted light amount on the basis of the measured light amount $E_1$ and the reference transmitted light amount $E_0$ obtained upon application of said drive voltage $V_0$.

6. A method according to claim 5, further comprising the steps of:

after correcting the relation between said drive voltage and said transmitted light amount, displaying on said specified area a high tone image and a low tone image, said high tone image being a predetermined number of tone levels higher than said substantial halftone, said low tone image being a predetermined number of tone levels lower than said substantial halftone;

measuring, with said transmitted light amount sensor, a transmitted light amount $E_2$ when said high tone image is displayed;

measuring, with said transmitted light amount sensor, a transmitted light amount $E_3$ when said low tone image is displayed; and correcting the relation between the tone and the transmitted light amount on the basis of the difference $\Delta E_{23}$ between the light amounts $E_2$ and $E_3$ and the reference light amount difference $\Delta E$ corresponding to the tone level difference $\Delta L$ between said high tone image and said low tone image.

7. A photographic printer for displaying an image on a liquid crystal panel, irradiating the light from a light source on said liquid crystal panel and exposing said image on a photosensitive material for a predetermined exposure time period by the light transmitted through said liquid crystal panel, said photographic printer comprising:

a transmitted light amount sensor for measuring the transmitted light amount; and means for starting said predetermined exposure time period when more than a predetermined light amount is measured by said transmitted light amount sensor after said light from the light source is irradiated on said liquid crystal panel.

8. In a photographic printer comprising a source light amount sensor for measuring the amount of light emitted from an LED light source, in which an image is displayed on a liquid crystal panel, the light from said LED light source is irradiated on said liquid crystal panel, and said image is exposed on a photosensitive material by the light transmitted through said liquid crystal panel, a method for controlling an exposure comprising the steps of:

supplying a predetermined drive current $I_O$ to said LED light source and thereby causing said LED light source to emit light;

measuring the light amount $E_{ST}$ from said LED light source by said source light amount sensor; and correcting at least one of:
the drive current for the LED light source,
the exposure time, and
the drive voltage applied to said liquid crystal panel for displaying said image on the basis of the reference light amount $E_{SO}$ to be obtained upon application of the drive current $I_O$ and the measured light amount $E_{ST}$ to obtain exposure conditions equivalent to the case where the light amount from the LED light source is the reference light amount $E_{SO}$.

* * * * *